(12) United States Patent
Radovich et al.

(10) Patent No.: US 12,002,993 B2
(45) Date of Patent: Jun. 4, 2024

(54) BATTERY PACK WITH WIRE BONDED BUS BARS

(71) Applicant: MILWAUKEE ELECTRIC TOOL CORPORATION, Brookfield, WI (US)

(72) Inventors: Kyle J. Radovich, West Bend, WI (US); Mark E. Brouwer, Hartford, WI (US); Michael A. Barrowclift, East Troy, WI (US); Max Karbin, Milwaukee, WI (US); Kyle R. Becker, Brookfield, WI (US); Tao Zhao, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/941,179

(22) Filed: Sep. 9, 2022

(65) Prior Publication Data

US 2023/0085453 A1 Mar. 16, 2023

Related U.S. Application Data

(60) Provisional application No. 63/242,816, filed on Sep. 10, 2021.

(30) Foreign Application Priority Data

Sep. 1, 2022 (CN) .......................... 202222315581.0

(51) Int. Cl.
*H01M 10/00* (2006.01)
*H01M 10/42* (2006.01)
(Continued)

(52) U.S. Cl.
CPC ....... *H01M 50/505* (2021.01); *H01M 10/425* (2013.01); *H01M 50/213* (2021.01);
(Continued)

(58) Field of Classification Search
CPC ............ H01M 50/505; H01M 10/425; H01M 50/213; H01M 50/218; H01M 50/247;
(Continued)

(56) References Cited

U.S. PATENT DOCUMENTS 6,144,017 A 11/2000 Millett et al.
7,033,691 B2 4/2006 Mardilovich et al.
(Continued)

FOREIGN PATENT DOCUMENTS

CN 104868069 A 8/2015
CN 205488400 U 8/2016
(Continued)

OTHER PUBLICATIONS

Harman, "Wire Bonding in Microelectronics" Third Edition, 2010, 32 pages including cover page, table of contents, introduction and Chapter 1 pp. 1-11.
(Continued)

*Primary Examiner* — Nicholas P D'Aniello
(74) *Attorney, Agent, or Firm* — Michael Best & Friedrich LLP

(57) ABSTRACT

A mobile power source that has a battery pack including at least two battery cell assemblies each having frame that has a first support member and a second support member, each of the first and second support members including a plurality of cylindrical recesses that receive the plurality of battery cells to support the battery cells. Bus bars are coupled to the first support member via injection molding and each is configured to electrically connect to at least two battery cells. The bus bars each include an elongated conductive body that has a base and fingers extending laterally away from the base. Each of the fingers extend within a first plane, and the base extends within a second plane that is parallel to the first plane and offset therefrom.

13 Claims, 34 Drawing Sheets

(51) Int. Cl.
*H01M 50/213* (2021.01)
*H01M 50/218* (2021.01)
*H01M 50/247* (2021.01)
*H01M 50/505* (2021.01)

(52) U.S. Cl.
CPC ....... *H01M 50/218* (2021.01); *H01M 50/247* (2021.01); *H01M 2220/30* (2013.01)

(58) Field of Classification Search
CPC ............. H01M 2220/30; H01M 10/48; H01M 50/519; Y02E 60/10
See application file for complete search history.

(56) References Cited

U.S. PATENT DOCUMENTS

| | | |
|---|---|---|
| 7,045,234 B2 | 5/2006 | Mardilovich et al. |
| 7,063,909 B2 | 6/2006 | Champion et al. |
| 7,671,565 B2 | 3/2010 | Straubel et al. |
| 7,780,745 B2 | 8/2010 | Silverman |
| 8,221,846 B2 | 7/2012 | Roche et al. |
| 8,475,954 B2 | 7/2013 | Ijaz et al. |
| 8,547,068 B2 | 10/2013 | Kim |
| 8,603,660 B2 | 12/2013 | Houchin-Miller et al. |
| 8,683,745 B2 | 4/2014 | Artwohl et al. |
| 8,865,338 B2 | 10/2014 | Sugawara et al. |
| 8,932,741 B2 | 1/2015 | Eberhard et al. |
| 8,945,747 B2 | 2/2015 | Eberhard et al. |
| 8,966,749 B2 | 3/2015 | Kim |
| 9,052,536 B2 | 6/2015 | Artwohl et al. |
| 9,166,422 B2 | 10/2015 | Brotto et al. |
| 9,368,838 B2 | 6/2016 | Nakagawa et al. |
| 9,425,488 B2 | 8/2016 | Seo et al. |
| 9,440,601 B2 | 9/2016 | Soleski et al. |
| 9,457,743 B2 | 10/2016 | Soleski et al. |
| 9,490,465 B2 | 11/2016 | Jan et al. |
| 9,660,244 B2 | 5/2017 | Dinkelman et al. |
| 9,685,644 B2 | 6/2017 | Lampe-Onnerud et al. |
| 9,698,403 B2 | 7/2017 | Soleski et al. |
| 9,711,778 B2 | 7/2017 | Dekeuster et al. |
| 9,716,263 B2 | 7/2017 | Dulle et al. |
| 9,722,231 B2 | 8/2017 | Soleski et al. |
| 9,735,414 B2 | 8/2017 | Biskup et al. |
| 9,793,530 B2 | 10/2017 | Wintner |
| 9,812,683 B2 | 11/2017 | Aiba et al. |
| 9,825,273 B2 | 11/2017 | Dulle |
| 9,831,482 B2 | 11/2017 | Balk et al. |
| 9,876,212 B2 | 1/2018 | Wintner |
| 9,893,519 B1 | 2/2018 | Castillo et al. |
| 9,899,658 B2 | 2/2018 | Biskup et al. |
| 9,923,184 B2 | 3/2018 | De Arroyabe et al. |
| 9,966,584 B2 | 5/2018 | Jan et al. |
| 9,985,268 B2 | 5/2018 | Houchin-Miller et al. |
| 9,997,763 B2 | 6/2018 | Biskup et al. |
| 10,044,018 B2 | 8/2018 | Soleski et al. |
| 10,090,508 B2 | 10/2018 | Kang |
| 10,103,374 B2 | 10/2018 | Balk et al. |
| 10,164,235 B2 | 12/2018 | Frohnmayer et al. |
| 10,193,123 B2 | 1/2019 | Wynn et al. |
| 10,205,150 B2 | 2/2019 | Wynn et al. |
| 10,205,331 B2 | 2/2019 | Jung |
| 10,211,444 B2 | 2/2019 | Dekeuster et al. |
| 10,243,183 B1 | 3/2019 | Harris, III |
| 10,243,184 B1 | 3/2019 | Harris, III |
| 10,333,117 B2 | 6/2019 | Son et al. |
| 10,450,637 B2 | 10/2019 | Siripurapu et al. |
| 10,468,654 B2 | 11/2019 | Dulle et al. |
| 10,511,006 B2 | 12/2019 | Dekeuster et al. |
| 10,580,333 B2 | 3/2020 | Artwohl et al. |
| 10,581,056 B2 | 3/2020 | Dulle et al. |
| 10,593,292 B2 | 3/2020 | Ninan et al. |
| 10,593,325 B2 | 3/2020 | Hazarika et al. |
| 10,593,925 B2 | 3/2020 | Dinkelman et al. |
| 10,608,231 B2 | 3/2020 | Dulle |
| 10,633,725 B2 | 4/2020 | Vo |
| 10,637,110 B1 | 4/2020 | Tsai et al. |
| 10,680,228 B2 | 6/2020 | Capati et al. |
| 10,741,817 B2 | 8/2020 | Goh et al. |
| 10,741,882 B2 | 8/2020 | Tabatowski-Bush et al. |
| 10,749,148 B2 | 8/2020 | Sun et al. |
| 10,780,564 B2 | 9/2020 | Iida et al. |
| 10,903,469 B2 | 1/2021 | Ju et al. |
| 10,930,909 B2 | 2/2021 | Wang et al. |
| 11,289,772 B2 | 3/2022 | Jan et al. |
| 2004/0256367 A1 | 12/2004 | Ruben |
| 2006/0040173 A1 | 2/2006 | Shimamura et al. |
| 2010/0216010 A1 | 8/2010 | Straubel et al. |
| 2011/0104532 A1 | 5/2011 | Buck et al. |
| 2011/0151315 A1 | 6/2011 | Masson et al. |
| 2011/0244283 A1 | 10/2011 | Seto et al. |
| 2012/0121937 A1 | 5/2012 | Kwak et al. |
| 2012/0135296 A1 | 5/2012 | Itoi et al. |
| 2012/0164490 A1 | 6/2012 | Itoi et al. |
| 2014/0017533 A1 | 1/2014 | Nishihara et al. |
| 2014/0322574 A1 | 10/2014 | Kropsch |
| 2015/0044527 A1 | 2/2015 | Neudecker et al. |
| 2015/0072209 A1 | 3/2015 | Tyler et al. |
| 2015/0072210 A1* | 3/2015 | Waigel ............... H01M 10/04 439/890 |
| 2016/0093930 A1 | 3/2016 | Biskup et al. |
| 2016/0141585 A1 | 5/2016 | Berg et al. |
| 2016/0164063 A1 | 6/2016 | Angerbauer et al. |
| 2017/0005378 A1 | 1/2017 | Rong |
| 2017/0008417 A1 | 1/2017 | Yoshida et al. |
| 2017/0133725 A1 | 5/2017 | Schwindt et al. |
| 2017/0256769 A1 | 9/2017 | Wynn et al. |
| 2017/0279104 A1 | 9/2017 | Beverley et al. |
| 2018/0112906 A1 | 4/2018 | Yi et al. |
| 2018/0261823 A1 | 9/2018 | Jan et al. |
| 2019/0088912 A1 | 3/2019 | Goh et al. |
| 2019/0103639 A1 | 4/2019 | Guglielmo et al. |
| 2019/0257885 A1 | 8/2019 | Kondo |
| 2019/0259986 A1 | 8/2019 | Harris, III |
| 2019/0296270 A1 | 9/2019 | Liu et al. |
| 2019/0296311 A1 | 9/2019 | Campbell et al. |
| 2020/0014077 A1 | 1/2020 | Tabatowski-Bush et al. |
| 2020/0044224 A1 | 1/2020 | Tabatowski-Bush et al. |
| 2020/0350547 A1 | 2/2020 | Lee et al. |
| 2020/0227699 A1 | 7/2020 | Muratsu et al. |
| 2020/0259153 A1 | 8/2020 | Capati et al. |
| 2020/0259154 A1 | 8/2020 | Jan et al. |
| 2020/0283875 A1 | 9/2020 | Vo |
| 2020/0014074 A1 | 11/2020 | Chi et al. |
| 2021/0091351 A1 | 3/2021 | Lee et al. |
| 2021/0249736 A1 | 8/2021 | Jan et al. |
| 2022/0407160 A1* | 12/2022 | Choi ................... H01M 50/262 |

FOREIGN PATENT DOCUMENTS

| | | |
|---|---|---|
| CN | 205609650 U | 9/2016 |
| CN | 106058342 A | 10/2016 |
| CN | 205723730 U | 11/2016 |
| CN | 205944344 U | 2/2017 |
| CN | 206076363 U | 4/2017 |
| CN | 105070961 B | 8/2017 |
| CN | 107134548 A | 9/2017 |
| CN | 206672980 U | 11/2017 |
| CN | 206806417 U | 12/2017 |
| CN | 109524608 A | 3/2019 |
| CN | 109524609 A | 3/2019 |
| CN | 109863624 A | 6/2019 |
| CN | 209217093 U | 8/2019 |
| CN | 209401936 U | 9/2019 |
| CN | 210516790 U | 5/2020 |
| CN | 211442204 U | 9/2020 |
| DE | 102012205020 A1 | 10/2013 |
| DE | 102015007615 A1 | 12/2016 |
| DE | 102015010824 A1 | 3/2017 |
| DE | 102015010825 A1 | 3/2017 |
| DE | 102015122213 A1 | 6/2017 |
| DE | 102012202694 B4 | 11/2017 |
| DE | 102017206110 A1 | 10/2018 |
| DE | 102018210017 A1 | 12/2019 |
| EP | 2355206 B1 | 10/2014 |

(56) References Cited

FOREIGN PATENT DOCUMENTS

| | | |
|---|---|---|
| EP | 2290731 B1 | 10/2016 |
| EP | 2764559 A1 | 9/2017 |
| EP | 3316348 A1 | 5/2018 |
| EP | 3327826 A1 | 5/2018 |
| JP | 2000182583 A | 6/2000 |
| JP | 2003045384 A | 2/2003 |
| JP | 2006244982 A | 9/2006 |
| JP | 2007280679 A | 10/2007 |
| JP | 2008041369 A | 2/2008 |
| JP | 2010146774 A | 7/2010 |
| JP | 2013177106 A | 9/2013 |
| JP | 2013232280 A | 11/2013 |
| JP | 2016136472 A | 7/2016 |
| JP | 2018005984 A | 1/2018 |
| WO | WO2013080136 A1 | 6/2013 |
| WO | WO2013131588 A2 | 9/2013 |
| WO | WO2015099476 A1 | 7/2015 |
| WO | WO2017132575 A1 | 8/2017 |
| WO | WO2017181618 A1 | 10/2017 |
| WO | WO2019206409 A1 | 10/2019 |
| WO | WO2020045851 A1 | 3/2020 |
| WO | WO2020214383 A1 | 10/2020 |
| WO | WO2020214384 A1 | 10/2020 |
| WO | WO2020221359 A1 | 11/2020 |
| WO | WO2020255878 A1 | 12/2020 |

OTHER PUBLICATIONS

Heraeus, "AluBond AIW49P," Facts Sheet, © 2018 (2 pages).
International Search Report and Written Opinion for Application No. PCT/US2022/042991 dated Jan. 4, 2023 (10 pages).

\* cited by examiner

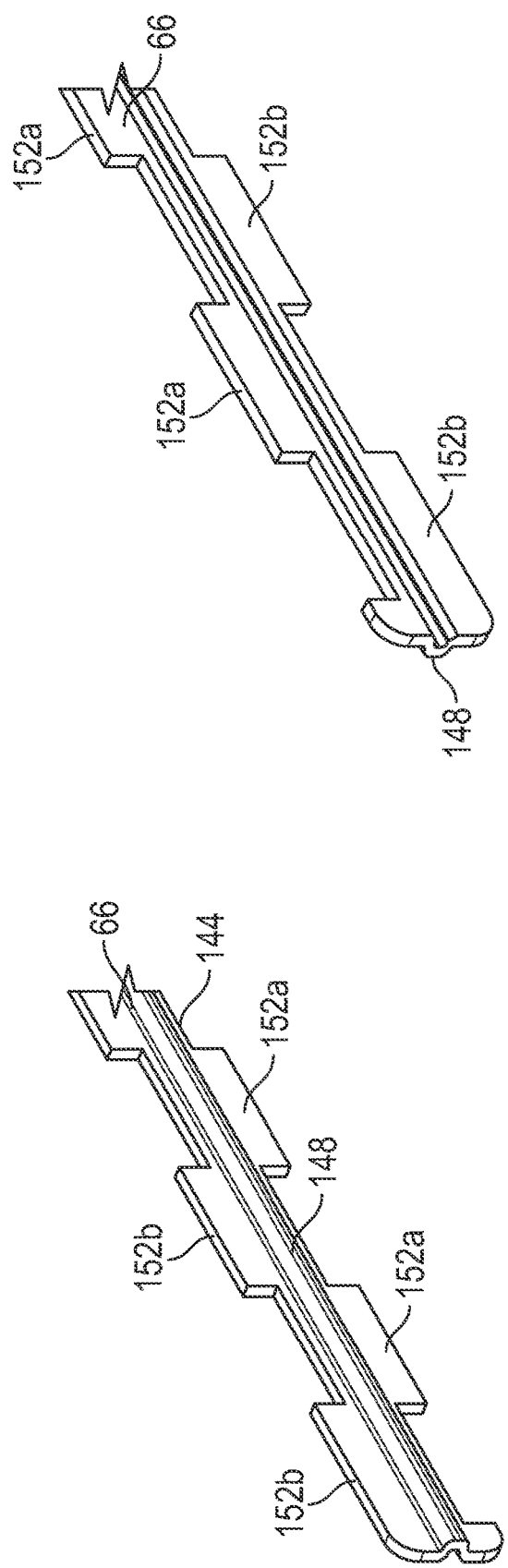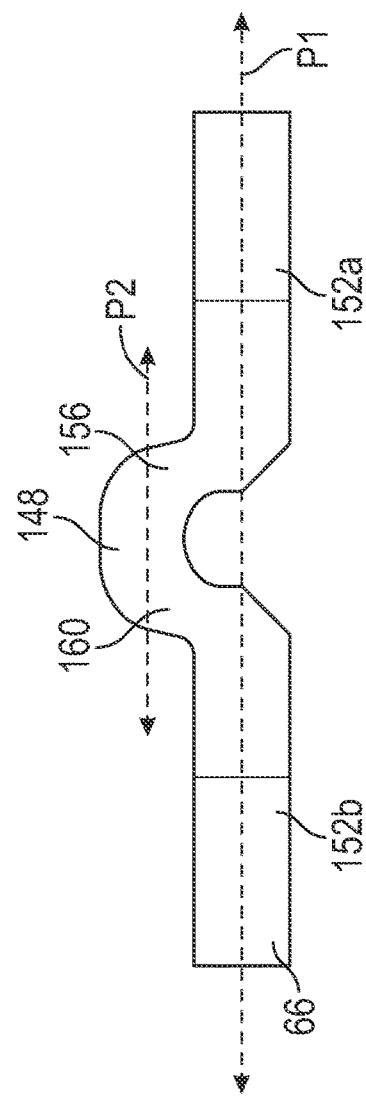
FIG. 12
FIG. 13
FIG. 14

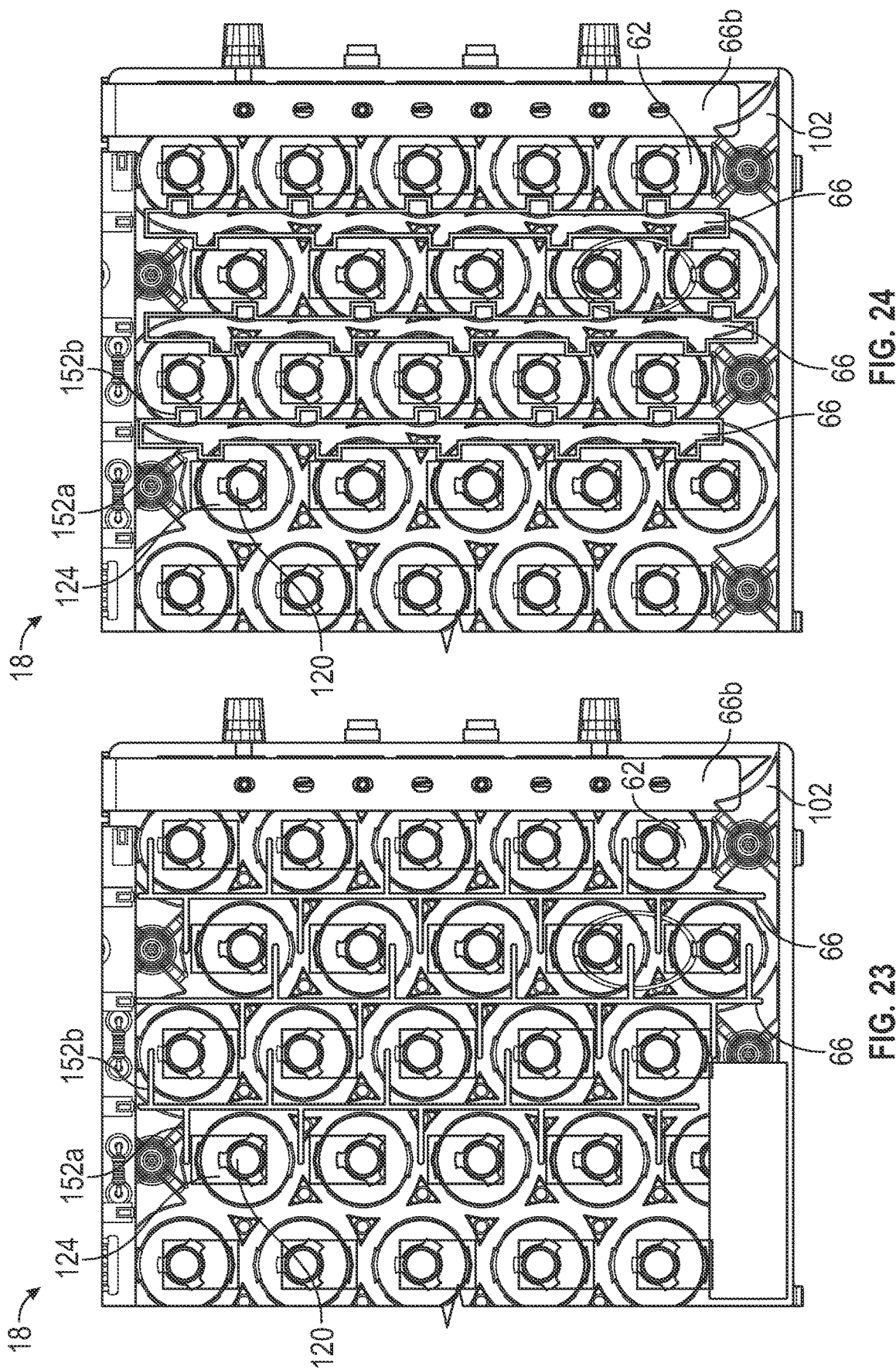

BATTERY PACK WITH WIRE BONDED BUS BARS

CROSS-REFERENCE TO RELATED APPLICATIONS

This application claims priority to U.S. Provisional Patent Application No. 63/242,816, filed Sep. 10, 2021, and to Chinese Utility Model Application No. 202222315581.0, filed on Sep. 1, 2022, the entire contents of each of which are incorporated by reference herein.

FIELD OF THE DISCLOSURE

The present disclosure relates to portable power devices such as battery packs.

BACKGROUND OF THE DISCLOSURE

A portable power device, such as a battery pack, may include a plurality of battery cells.

SUMMARY OF THE DISCLOSURE

The present disclosure provides, in one aspect, a mobile power source including a battery pack having at least two battery pack assemblies. Each battery cell assembly includes a plurality of battery cells each having a first end, a second end opposite the first end, a positive terminal located at the first end and a negative terminal located at the first end. Each battery cell assembly also includes a frame having a first support member and a second support member, each of the first and second support members including a plurality of cylindrical recesses that receive the plurality of battery cells to support the battery cells. Each battery cell assembly further includes a plurality of bus bars coupled to the first support member and configured to electrically connect to at least two battery cells. Each bus bar includes an elongated conductive body having a base, a plurality of first fingers extending laterally away from the base in a first direction, and a plurality of second fingers extending laterally away from the base in a second direction opposite the first direction. The first fingers and the second fingers extend within a first plane, and the base extends within a second plane that is parallel to the first plane and offset therefrom.

In some constructions, at least two bus bars of the plurality of bus bars are located adjacent one another with the first fingers of each of the at least two bus bars aligned with one another along a direction of a longitudinal axis of the battery pack. In such constructions, the second fingers of each of the at least two bus bars are aligned with one another along the direction of the longitudinal axis of the battery pack. In some constructions, the first fingers and the second fingers are alternatingly arranged along a longitudinal length of the bus bars. In some constructions, a plurality of wires connects the first fingers of one bus bar to the negative terminals of at least two battery cells and connects the second fingers of the at least one bus bar to the positive terminals.

The present disclosure provides, in another aspect, a battery pack including at least two battery cell assemblies. Each battery cell assembly includes a plurality of battery cells each having a first end, a second end opposite the first end, a positive terminal located at the first end and a negative terminal located at the first end. Each battery cell assembly also includes a frame having a first support member and a second support member, each of the first and second support members including a plurality of cylindrical recesses that receive the plurality of battery cells to support the battery cells. Each battery cell assembly further includes a plurality of bus bars coupled to the first support member. Each bus bar includes an elongated conductive body having a base, a plurality of first fingers extending laterally away from the base in a first direction, and a plurality of second fingers extending laterally away from the base in a second direction opposite the first direction. Each battery cell assembly also includes a plurality of wires connecting the first fingers of one bus bar to the negative terminals of at least two battery cells and connecting the second fingers of the at least one bus bar to the positive terminals of at least two different battery cells. The first fingers and the second fingers extend within a first plane, and the base extends within a second plane that is parallel to the first plane and offset therefrom.

The present disclosure provides, in another aspect, a mobile power source comprising a battery pack including at least two battery cell assemblies. Each battery cell assembly includes a plurality of battery cells each having a first end, a second end opposite the first end, a positive terminal located at the first end and a negative terminal located at the first end, a frame having a first support member and a second support member, and bus bars coupled to the first support member via injection molding and configured to electrically connect to at least two battery cells. Each of the first and second support members include a plurality of cylindrical recesses that receive the plurality of battery cells to support the battery cells, and each bus bar includes an elongated conductive body having a base and fingers extending laterally away from the base. The fingers extend within a first plane, and the base extends within a second plane that is parallel to the first plane and offset therefrom.

The present disclosure provides, in another aspect, a mobile power source comprising a battery pack including at least two battery cell assemblies. Each battery cell assembly includes a plurality of battery cells each having a first end, a second end opposite the first end, a positive terminal located at the first end and a negative terminal located at the first end, a frame having a first support member and a second support member, and a bus bar positioned within each of the plurality of elongate recesses of the first support member and configured to electrically connect to at least two battery cells. Each of the first and second support members includes a plurality of cylindrical recesses arranged in vertical columns that receive the plurality of battery cells to support the battery cells and elongate recesses. Each of the elongate recesses is positioned adjacent to at least one column of the plurality of cylindrical recesses. Each of the bus bars includes an elongated conductive body having a base and fingers extending laterally away from the base. The base defines a recess. The fingers extend within a first plane and the base extends within a second plane that is parallel to the first plane and offset therefrom. A connection member is positioned within the recess in each base and is integrally formed with the first support member to couple the corresponding bus bar to the first support member. Wires connect the fingers of each the bus bars to either the positive terminal or the negative terminals.

The present disclosure provides, in another aspect, a method of forming a mobile power supply, the method includes forming a frame having a first support member and a second support member. Each of the first and second support members are formed from a plastic material and include a plurality of cylindrical recesses arranged in vertical columns that receive the plurality of battery cells to support the battery cells and elongate recesses, where each of the elongate recesses is positioned adjacent to at least one column of the plurality of cylindrical recesses. The method further includes positioning a bus bar within one of the elongate recesses of the first support member. Each bus bar includes an elongated conductive body having a base and fingers extending laterally away from the base. The base defines a recess, the fingers extends within a first plane, and the base extends within a second plane that is parallel to the first plane and offset therefrom. The method further includes injecting the recess of each of the bases with the plastic material such that the plastic material fills the recess and integrally forms with the first support member and positioning a plurality of battery cells between the first support member and the second support member such that the plurality of cylindrical recesses of the first support member and the second support member support the plurality of battery cells. Each of the battery cells have a first end, a second end opposite the first end, a positive terminal located at the first end, and a negative terminal located at the first end. The method also includes wire bonding wires between the fingers each of the bus bars and either the positive terminal or the negative terminals.

Other aspects of the disclosure will become apparent by consideration of the detailed description and accompanying drawings.

BRIEF DESCRIPTION OF THE DRAWINGS

FIGS. 12 and 13 are partial perspective views of a bus bar of the battery cell assembly of FIG. 10.

FIG. 14 is an end view of the bus bar of the battery cell assembly of FIG. 8.

FIG. 23 is a partial side view of the battery cell assembly of FIG. 8 according to another embodiment.

FIG. 24 is a partial side view of the battery cell assembly of FIG. 8 according to another embodiment.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
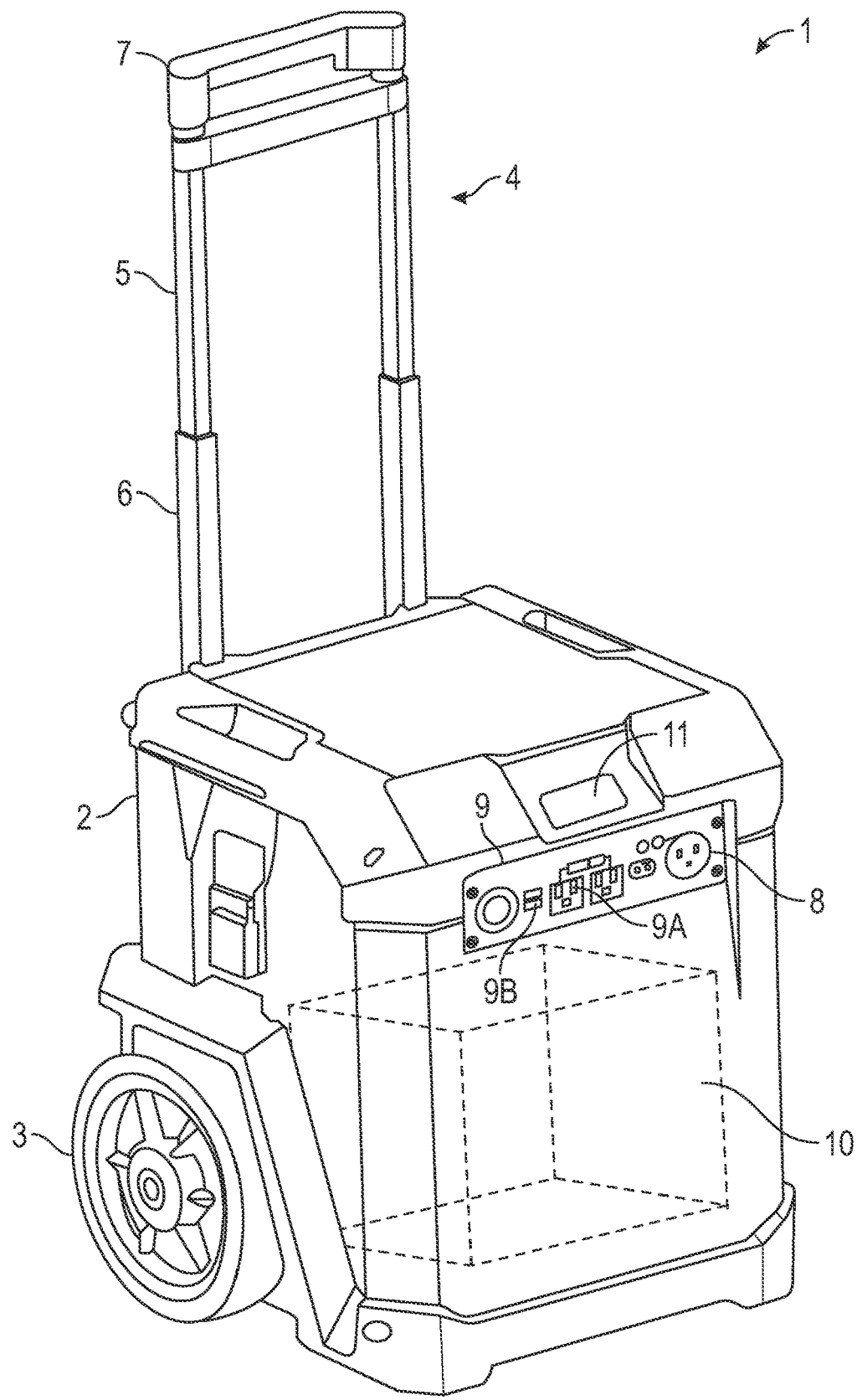
FIG. 1 is a perspective view of a power supply.

FIG. 1 illustrates a portable power supply device or power supply 1. The portable power supply device 1 includes a housing 2. In some embodiments, the power supply 1 includes one or more wheels 3 coupled to the housing 2, and a handle assembly 4 coupled to the housing 2. In the illustrated embodiment, the handle assembly 4 is a telescoping handle movable between an extended position and a collapsed position. The handle assembly 4 includes an inner tube 5 and an outer tube 6. The inner tube 5 fits inside the outer tube 6 and is slidable relative to the outer tube 6. The inner tube 5 is coupled to a horizontal holding member 7. In some embodiments, the handle assembly 4 further includes a locking mechanism to prevent inner tube 5 from moving relative to the outer tube 6 by accident. The locking mechanism may include notches, sliding catch pins, or another suitable locking mechanism to inhibit the inner tube 5 from sliding relative to the outer tube 6 when the handle assembly 4 is in the extended position and/or in the collapsed position. In practice, a user holds the holding member 7 and pulls upward to extend the handle assembly 4. The inner tube 5 slides relative to the outer tube 6 until the handle assembly 4 locks in the extended position. The user may then pull and direct the power supply 1 by the handle assembly 4 to a desired location. The wheels 3 of the power supply 1 facilitate such movement.

The housing 2 of power supply 1 further includes a power input panel 8, a power output panel 9, and a display 11. In the illustrated embodiment, the power input panel 8 includes multiple electrical connection interfaces configured to receive power from an external power source. In some embodiments, the external power source may be a DC power source, for example, a photovoltaic cell (e.g., a solar panel), or the power source may be an AC power source, for example, a conventional wall outlet. In some embodiments, the power input panel 8 is replaced by or additionally includes a cable configured to plug into a conventional wall outlet. The power received by power input panel 8 may be used to charge an internal power source 10 disposed within the housing 2 of power supply 1.

The power output panel 9 includes one more power outlets. In the illustrated embodiment, the power output panel 9 includes a plurality of AC power outlets 9A and DC power outlets 9B. It should be understood that number of power outlets included in power output panel 9 is not limited to the power outlets illustrated in FIG. 1. For example, in some embodiments of the power supply 1, the power output panel 9 may include more or fewer power outlets than the power outlets included in the illustrated embodiment of power supply 1. The power output panel 9 is configured to provide power from the internal power source 10 to one or more peripheral devices. The one or more peripheral devices may be a smartphone, a tablet computer, a laptop computer, a portable music player, a power tool, a power tool battery pack, a power tool battery pack charger, or the like. The peripheral devices may be configured to receive DC and/or AC power from the power output panel 9. In some embodiments, the power supply 1 also includes one or more battery pack charging receptacles (not shown) configured to receive one ore more battery packs and provide power from the internal power source 10 to the one or more battery packs.

The display 11 is configured to indicate a state of the power supply 1 to a user, such as state of charge of the internal power source 10 and/or fault conditions. In some embodiments the display 11 includes one or more light-emitting diode ("LED") indicators configured to illuminate and display a current state of charge of internal power source 10. In some embodiments, the display 11 is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other embodiments, the power supply 1 does not include a display.

FIGS. 2-30 illustrate all or portions of the internal power source 10 according to several different embodiments. Hereafter, the internal power source 10 will be referred to as a battery pack assembly 10.

With reference to FIG. 2-6, in one embodiment, the battery pack assembly 10 includes a housing 14 and a plurality of battery cell assemblies 18 received within the housing 14. In the illustrated embodiment, the battery pack assembly 10 includes two battery cell assemblies 18. In other embodiments, the battery pack assembly 10 may include one or more battery cell assemblies 18 (e.g., three, four, etc.). The battery pack assembly 10 is configured to be a high power battery pack connectable to and operable to power various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), etc. and non-motorized electrical devices (e.g., a power source, a light, an AC/DC adapter, a generator, personal electronic device, etc.), any one of which is now referred to herein as "device."

The housing 14 includes a top side 22, a bottom side 26, a first lateral side 30, a second lateral side 34 opposite the first lateral side 30, a first end 38, and a second end 42 opposite the first end 38. In addition, the housing 14 includes a longitudinal axis 46 extending through the first end 38 and the second end 42. A lateral axis 50 of the housing 14 extends through the first lateral side 30 and the second lateral side 34. The lateral axis 50 is perpendicular to the longitudinal axis 46.

Figure 3:
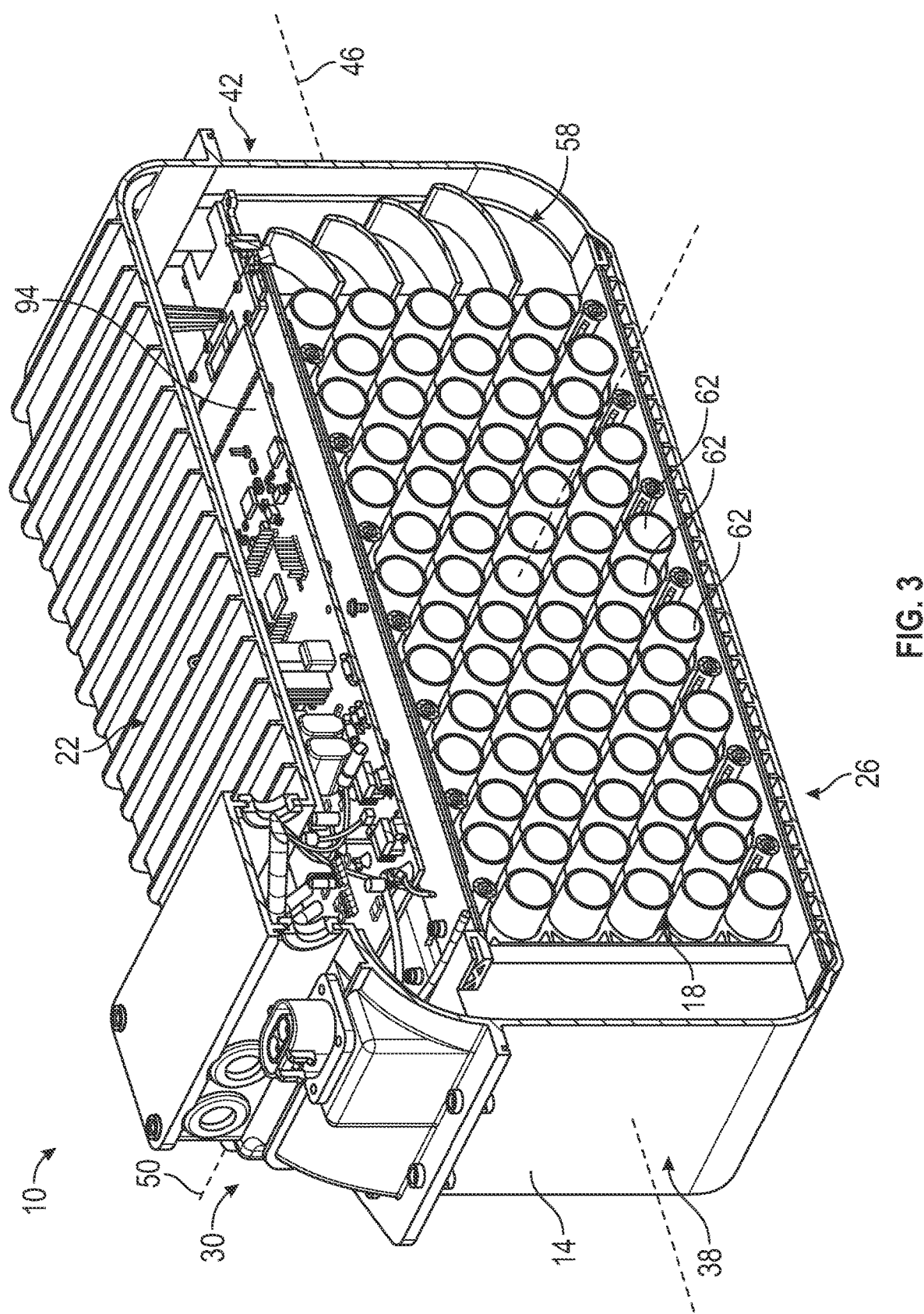
FIG. 3 is a cross-sectional view of the battery pack assembly of FIG. 2, taken along line 3-3 of FIG. 2.
Figure 4:
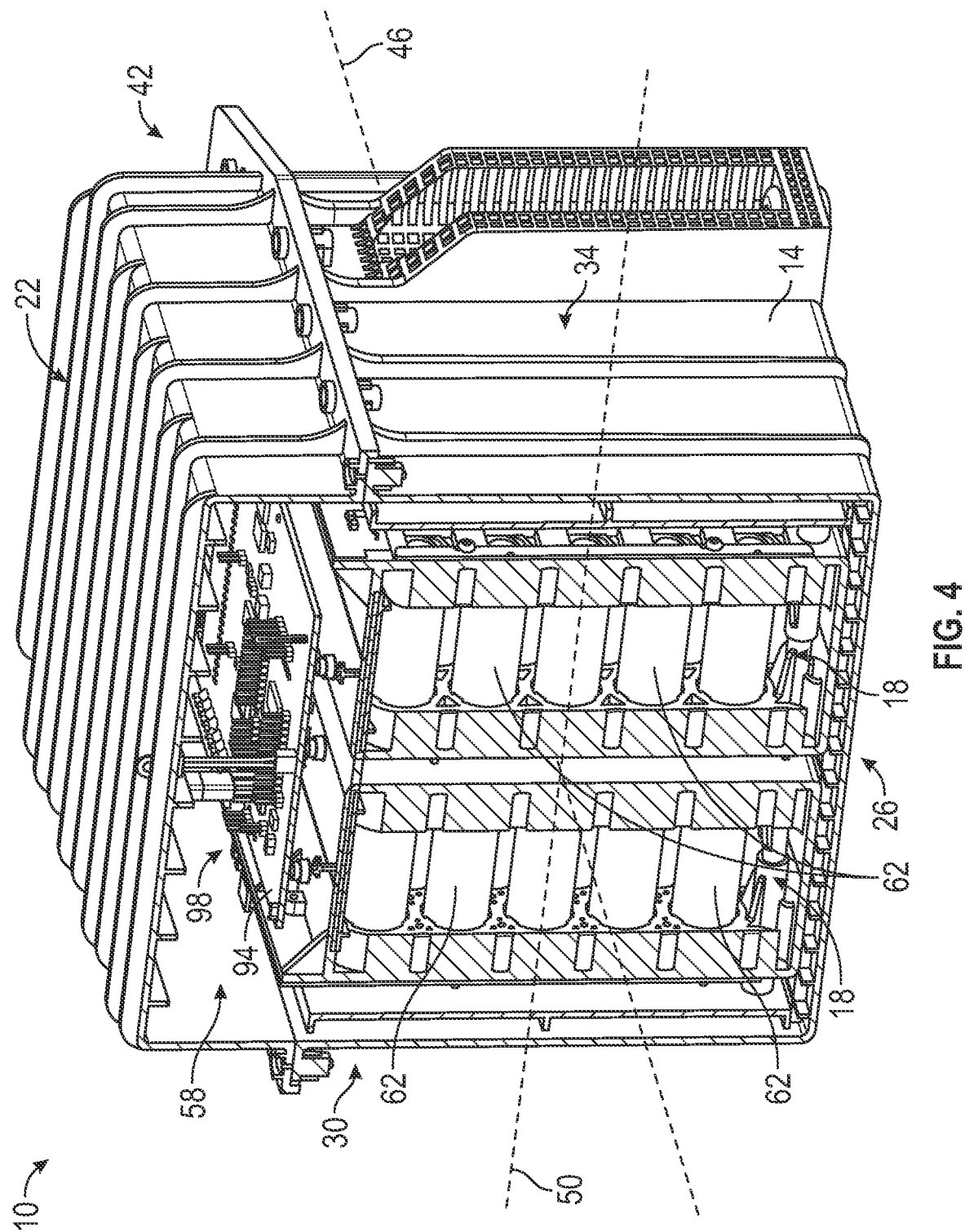
FIG. 4 is another cross-sectional view of the battery pack assembly of FIG. 2, taken along line 4-4 of FIG. 2.
Figure 5:
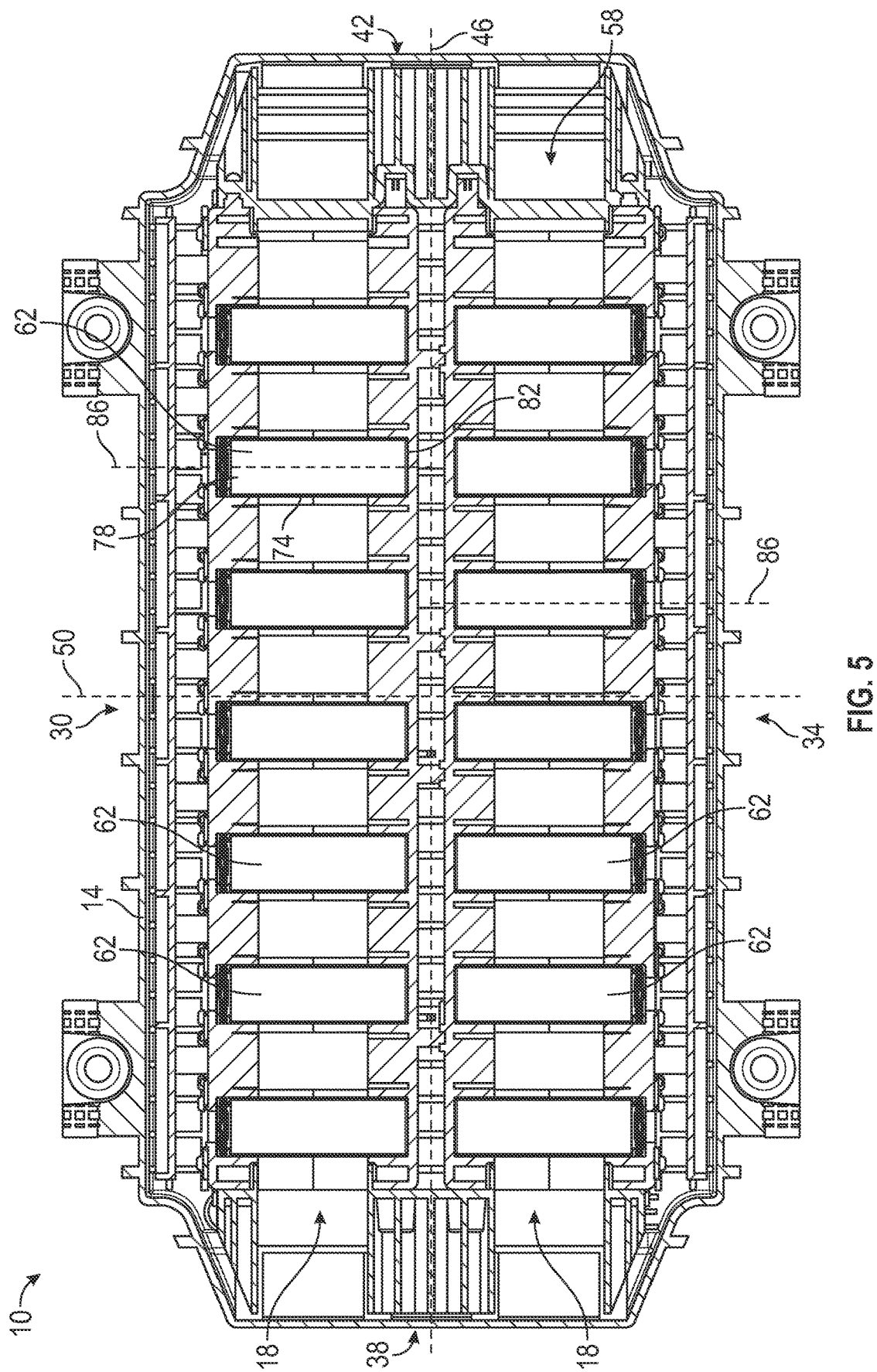
FIG. 5 is another cross-sectional view of the battery pack assembly of FIG. 2, taken along line 5-5 of FIG. 2.

With reference to FIGS. 3-5, the housing 14 further includes an internal cavity 58 defined therewithin. Each battery cell assembly 18 is positioned within the internal cavity 58. In addition, the housing 14 is sealed such that the internal cavity 58 is not in fluid communication with an exterior of the battery pack assembly 10. In other embodiments (not shown), the housing 14 can be unsealed.

With reference to FIGS. 4-7, each battery cell assembly 18 includes a plurality of battery cells 62, a plurality of bus bars 66, and a housing or frame 70 supporting the plurality of battery cells 62 within the internal cavity 58. Each battery cell 62 has a body 74 extending between a first end 78 and a second end 82. In addition, each body 74 extends along a battery cell axis 86 (FIG. 5) that extends through the respective first and second lateral sides 30, 34, respectively of the housing 14.

Figure 5A:
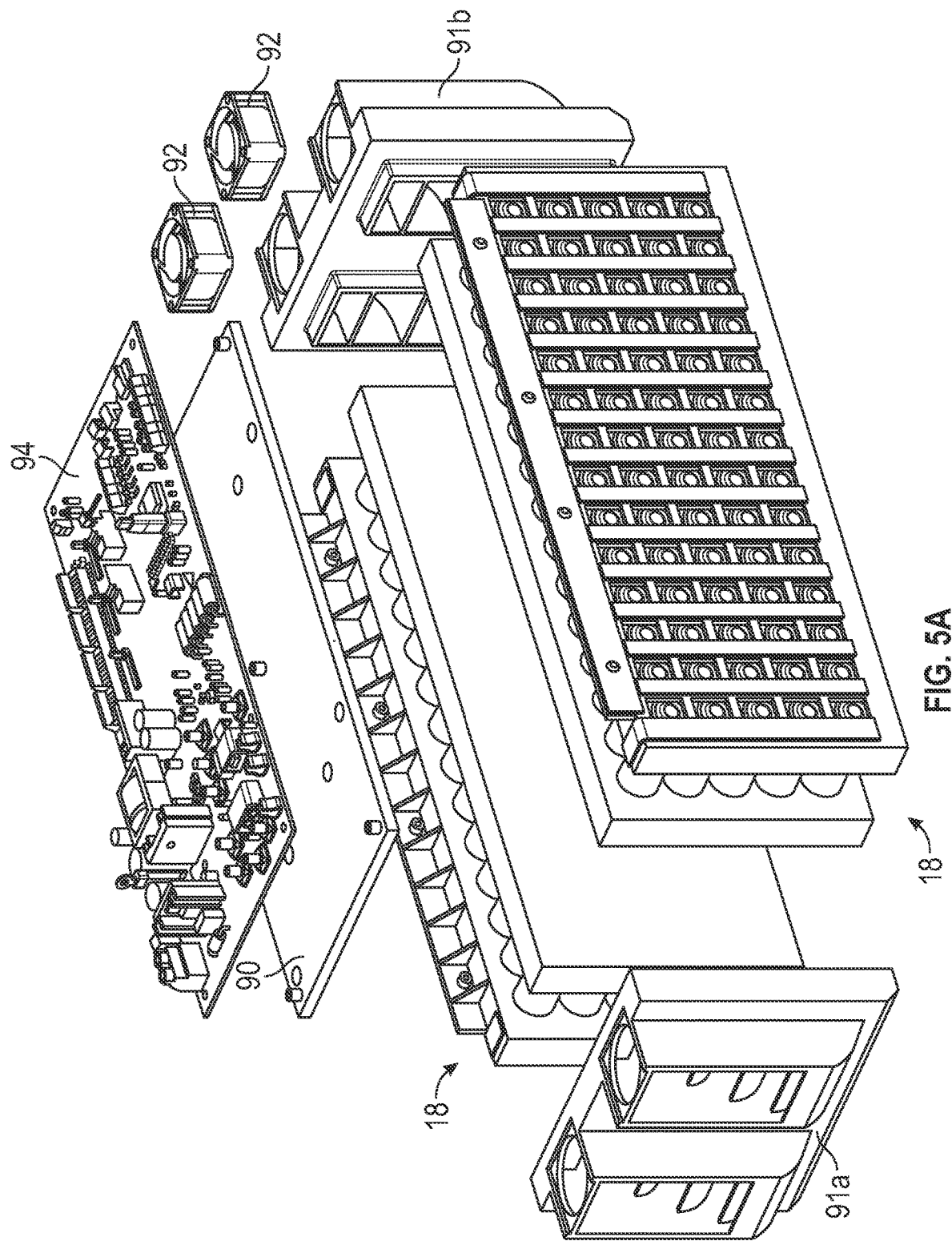
FIG. 5A is a partially exploded perspective view of the battery pack assembly of FIG. 2 with portions removed.

A support plate 90 (FIG. 6) is secured to each of the battery cell assemblies 18 at a top side thereof adjacent the top side 22 of the housing 14. In addition, the longitudinal ends of the battery cell assemblies 18 are secured to fan cowls 91a and 91b (FIG. 5A) that are provided adjacent to the first end 38 or the second end 42 of the housing 14, respectively. The fan cowls 91a, 91b can be coupled to the battery cell assemblies 18 before the support plate 90 is secured to the cell assemblies 18 to aid with aligning the support plate 90 with the cell assemblies 18. The fan cowls 91a, 91b receive one or more fans 92 operable to generate an airflow within the internal cavity 58 to provide thermal benefit to the battery pack assembly 10. The battery pack assembly 10 also includes a main printed circuit board (PCB) 94 coupled to the support plate 90. The main PCB 94 supports control circuitry 98 for controlling operation of the battery pack assembly 10.

Each battery cell assembly 18 is arranged within the internal cavity 58 such that each of the battery cells 62 are oriented relative to the longitudinal axis 46 of the housing 14. In the illustrated embodiment, the battery cell axis 86 of each respective battery cell 62 extends perpendicular to the longitudinal axis 46 (or parallel to the lateral axis 50) within the internal cavity 58. In other embodiments, the battery cell axis 86 may be oriented parallel to the longitudinal axis 46 and/or some of the battery cell axes 86 may be oriented in the same or different directions. In the illustrated embodiment, each battery cell assembly 18 includes seventy battery cells 62. In other embodiments, the battery cell assembly 18 may include two or more battery cells 62. The housing 14 is shaped and sized to receive a predetermined number of battery cell assemblies 18 in which each battery cell assembly 18 has a portion of the predetermined number of battery cells 62.

With reference to FIGS. 6-9, the frame 70 of each battery cell assembly 18 includes a first support member 102 and a second support member 104 coupled to the first support member (e.g., via fasteners 112). Each support member 102, 104 defines a plurality of cylindrical recesses 108 corresponding to the battery cells 62. The recesses 108 of the first support member 102 receive the first ends 78 of the battery cells 62 and the recesses 108 of the second support member 104 receive the second ends of the battery cells 62. As such, each support member 102, 104 has the same number of recesses 108 as the number of battery cells 62. The illustrated recesses 108 are arranged in vertical columns (i.e., along a direction perpendicular to both the longitudinal and lateral axes 46, 50). And, the recesses 108 of adjacent vertical columns are staggered relative to one another. Accordingly, the support members 102, 104 locate and maintain a position of each battery cell 62 within the internal cavity 58.

Figure 6:
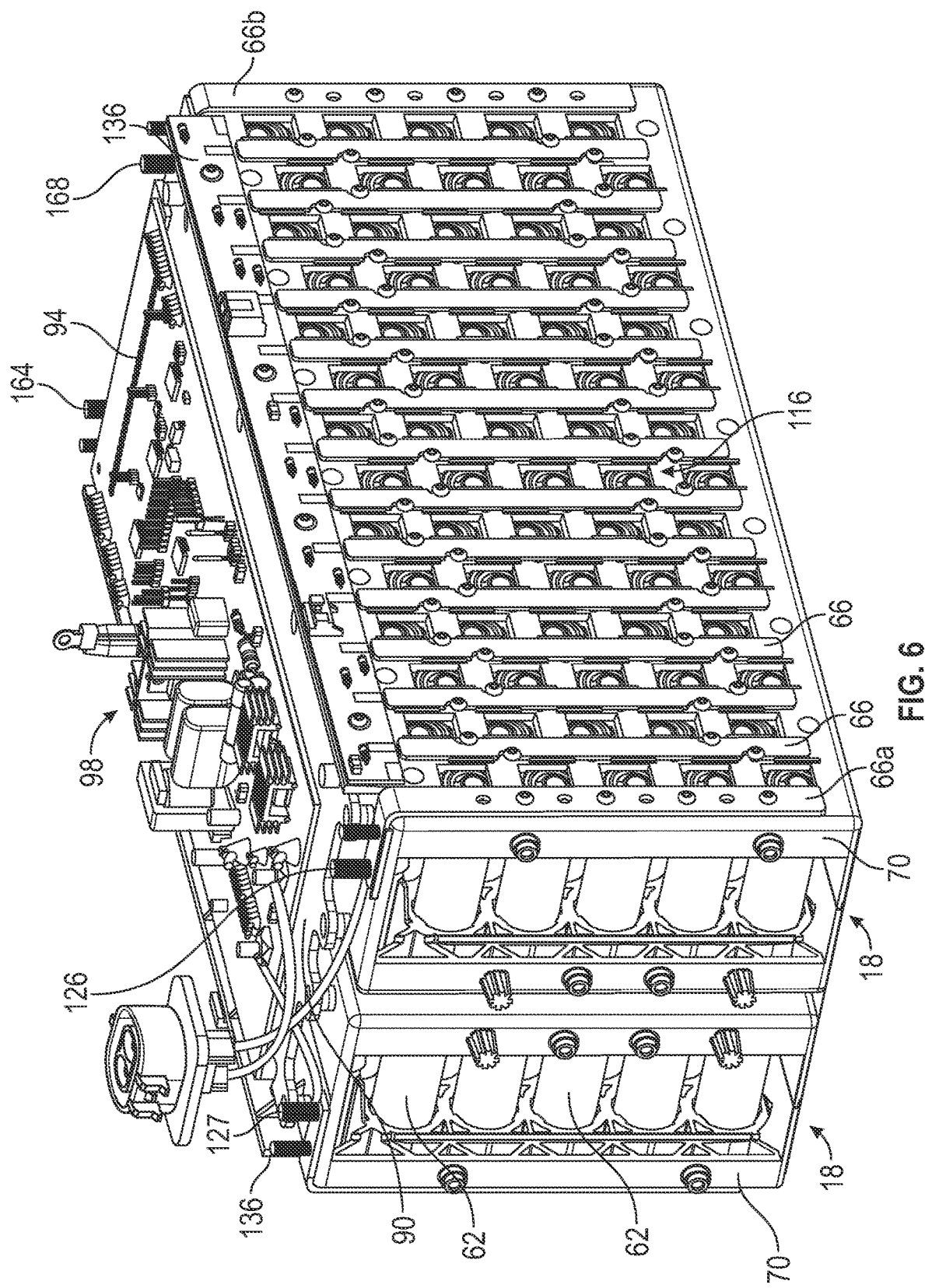
FIGS. 6 and 7 are perspective views of the battery pack assembly of FIG. 2 with portions removed.
Figure 7:
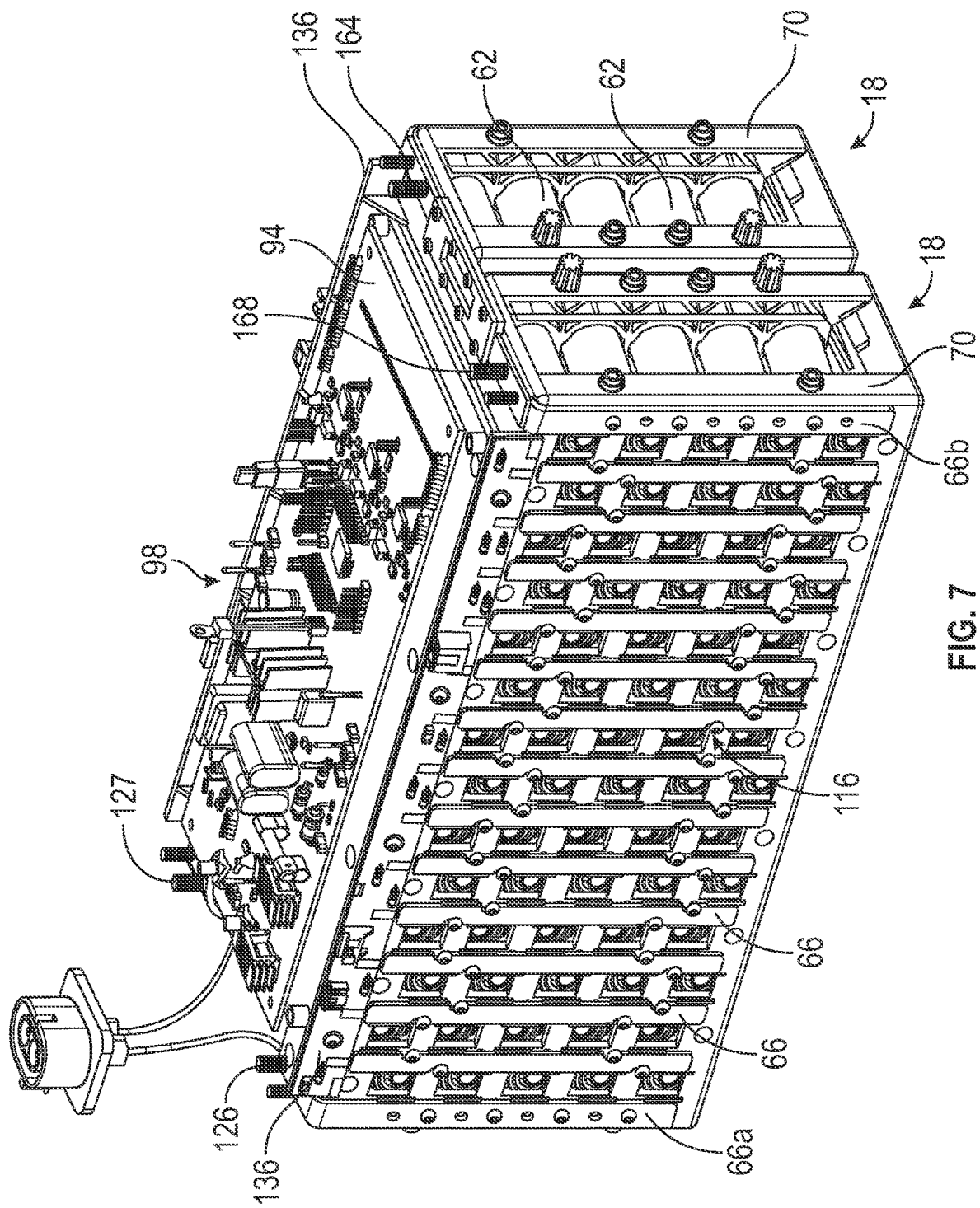
Figure 8:
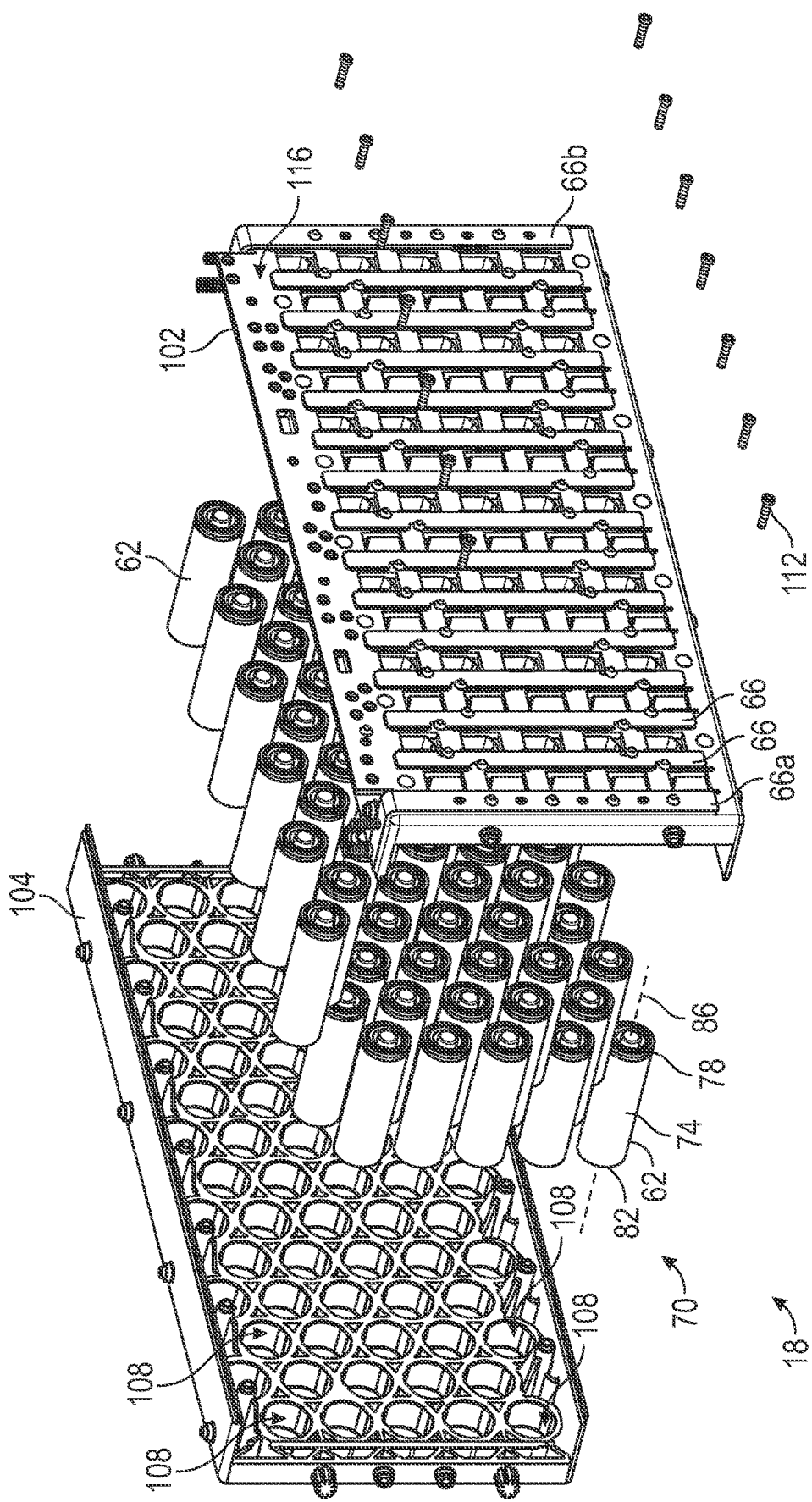
FIGS. 8 and 9 are partially exploded perspective views of a battery cell assembly of the battery pack assembly of FIG. 2.
Figure 9:
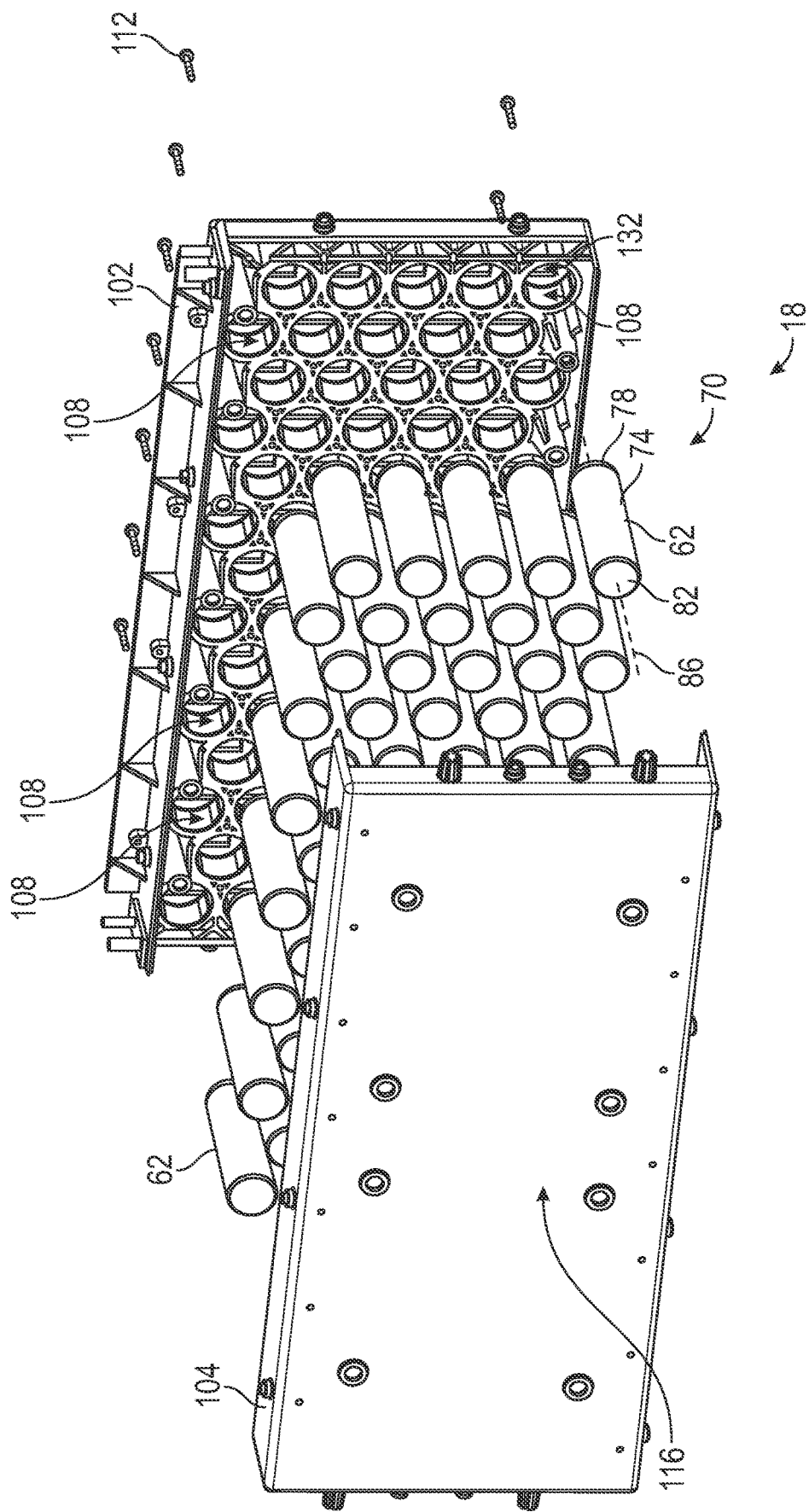

Within the battery pack assembly 10, the first support member 102 of each battery cell assembly 18 is located adjacent the lateral sides 30 or 34, respectively. The second support members 104 are positioned opposite the first support members 102 and inward relative to the first support members 102 within the internal cavity 58. Each support member 102, 104 of the two battery cell assemblies 18 includes a lateral surface 116 (FIGS. 6 and 7). The lateral surfaces 116 of the second support members 104 are positioned in facing relationship with each other within the internal cavity 58. The lateral surfaces 116 of the first support members 102 face away from one another and support at least a portion of the bus bars 66 of each battery cell assembly 18.

Figure 10:
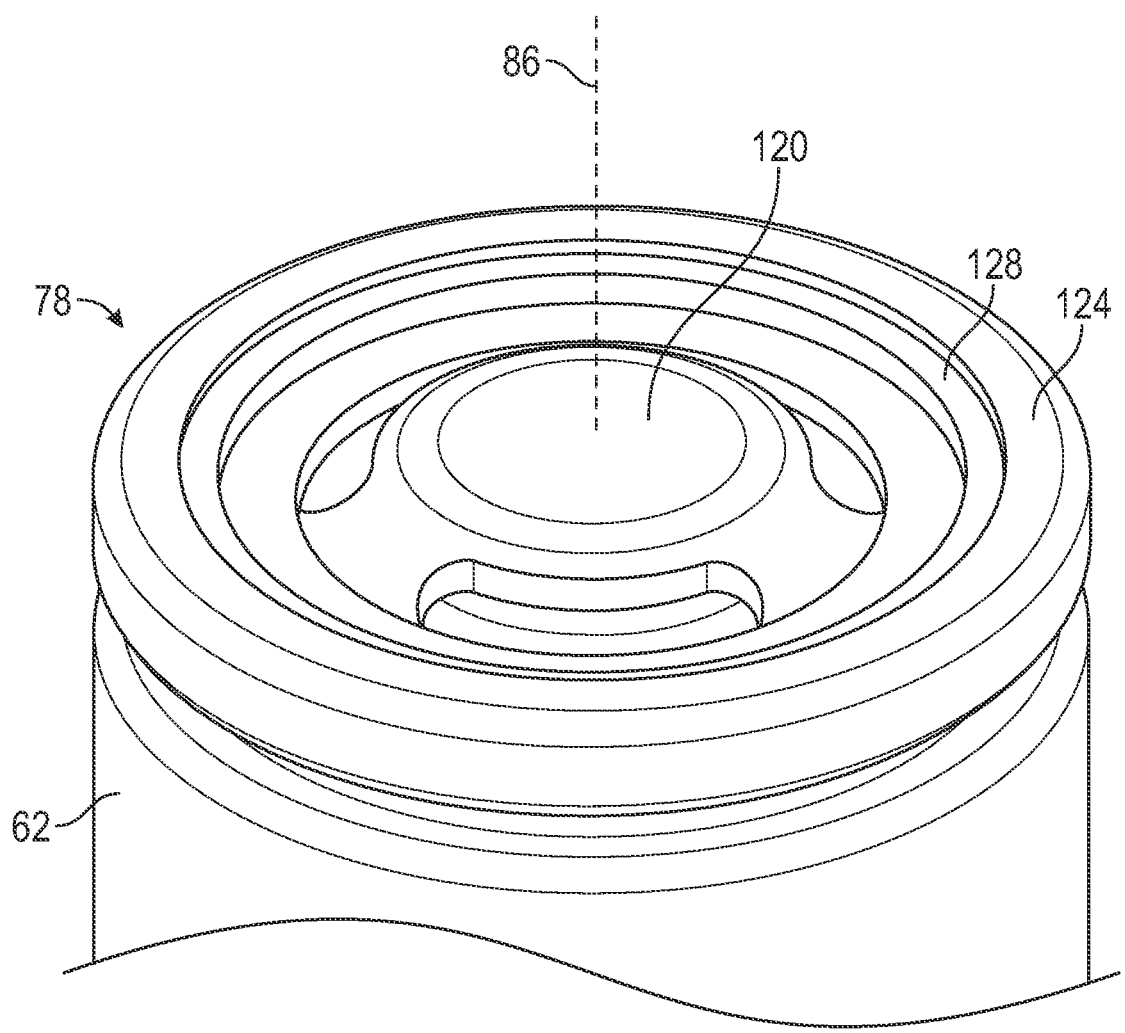
FIG. 10 is a partial perspective view of a battery cell of the battery pack assembly of FIG. 2.

With reference to FIG. 10, each battery cell 62 includes a positive terminal 120 and a negative terminal 124 that are each located at the first end 78. The positive terminal 120 is located at a central region of the first end 78. The negative terminal 124 is located radially outward from the positive terminal 120. In the illustrated embodiment, the negative terminal 124 is formed as a portion of the canister crimp of the battery cell 62. An insulator or gasket 128 separates the positive terminal 120 from the negative terminal 124 to prevent short circuiting. Each battery cell 62 may have a nominal voltage between about 3 V and about 5 V and may have a nominal capacity between about 2 Ah and about 6 Ah (in some cases, between about 3 Ah and about 5 Ah). The battery cells 62 may be any rechargeable battery cell chemistry type, such as, for example, lithium (Li), lithium-ion (Li-ion), other lithium-based chemistry, nickel-cadmium (NiCd), nickel-metal hydride (NiMH), etc.

With reference to FIGS. 6 and 7, the battery cells 62 may be connected in series, parallel, or a combination of series and parallel to provide the desired electrical characteristics (e.g., nominal voltage, current output, current capacity, power capacity, etc.) of the battery pack assembly 10. The battery cells 62 are electrically connected by the bus bars 66. In the illustrated embodiment, the battery cells 62 are connected in a series-parallel arrangement with five groups of the battery cells 62 connected in parallel, and each group having fourteen battery cells 62 connected in series (i.e., a "14s5p" arrangement). The two battery cell assemblies 18 are connected with each other in series along with main positive and negative terminals 126, 127 of the battery pack assembly 10. Accordingly, the battery pack assembly 10 includes, in total, 140 battery cells 62 arranged in five parallel-connected groups of 28 series-connected battery cells 62 (i.e., a "28s5p" battery pack assembly).

Figure 11:
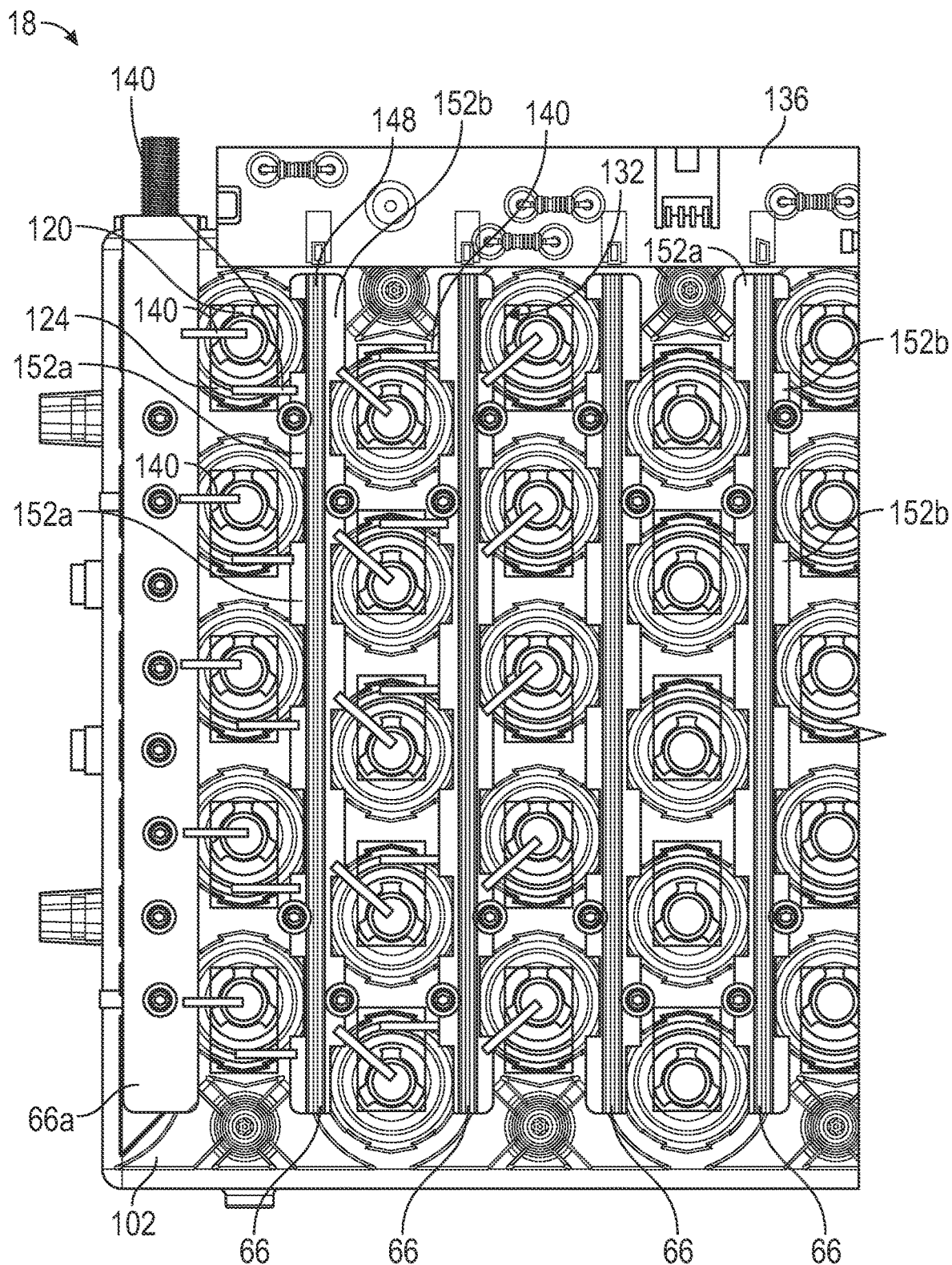
FIG. 11 is a partial side view of the battery cell assembly of FIG. 8.

With reference to FIG. 11, the first support member 102 includes a plurality of apertures 132 extending between the lateral surface 116 and a bottom surface of each cylindrical recess 108. The apertures 132 expose the positive and negative terminals 120, 124 of each battery cell 62. The bus bars 66 extend in the vertical direction along the lateral surface 116 and are positioned between each column of the battery cells 62. Each battery cell assembly 18 also includes a voltage sensing PCB 136 supported on the lateral surface 116 of the first support member 102 adjacent the main PCB 94 and adjacent the top side 22 of the housing 14. The voltage sensing PCB 136 may be electrically coupled to the bus bars 66 (e.g., via bonded wires 140 or soldering, as discussed below) and configured to sense voltages of the battery cells 62.

In the illustrated embodiment, each battery cell 62 is connected by wires 140 to the two adjacent bus bars 66 extending on either side of the battery cell 62 (e.g., by a wire bonding process such as welding). In the illustrated embodiment, from the frame of reference of FIG. 11, the positive terminal 120 of each battery cell 62 is connected by one wire 140 to the adjacent bus bar 66 located to the left of the battery cell 62. Each negative terminal 124 of each battery cell 62 is connected by one wire 140 to the adjacent bus bar 66 located to the right of the battery cell 62. Thus, the positive terminals 120 of the five battery cells 62 of each vertical column are each connected by wires 140 to the adjacent bus bar 66 located to the left, and the negative terminals 124 of the five battery cells 62 of each vertical column are each connected by wires 140 to the adjacent bus bar 66 located to the right. Each bus bar 66 is coupled to at least two or more battery cells 62. In the illustrated embodiment, each bus bar 66 is coupled to ten battery cells 62 (i.e., to the five negative terminals 124 to the left of the bus bar 66 and to the five positive terminals 120 to the right of the bus bar 66).

With reference to FIGS. 11-14, each illustrated bus bar 66 is formed as an elongated conductive body 144 having a longitudinal ridge or base 148, a plurality of first fingers 152a protruding laterally outward from a first side of the base 148, and a plurality of second fingers 152b protruding laterally outward from an opposite second side of the base 148. The fingers 152a, 152b are generally equal in width and each project the same lateral distance outward from the base 148. The fingers 152*a*, 152*b* are generally flat and each extend within a first plane P1 (FIG. 14). The base 148 is also generally flat and extends within a second plane P2 that is parallel to the first plane P1 and offset therefrom. A first connecting section 156 connects the base 148 to the first fingers 152*a* and a second connecting section 160 connects the base 148 to the second fingers 152*b*. The fingers 152*a*, 152*b* are misaligned with each other along a longitudinal length of the bus bar 66 and are arranged in a staggered or alternating configuration. In other words, moving along the longitudinal length of the bus bar 66 from a first longitudinal end toward an opposite second longitudinal end, each first finger 152*a* is followed by a second finger 152*b*, which is then followed by a subsequent first finger 152*a*, followed by a subsequent second finger 152*b*, etc.

Figure 2:
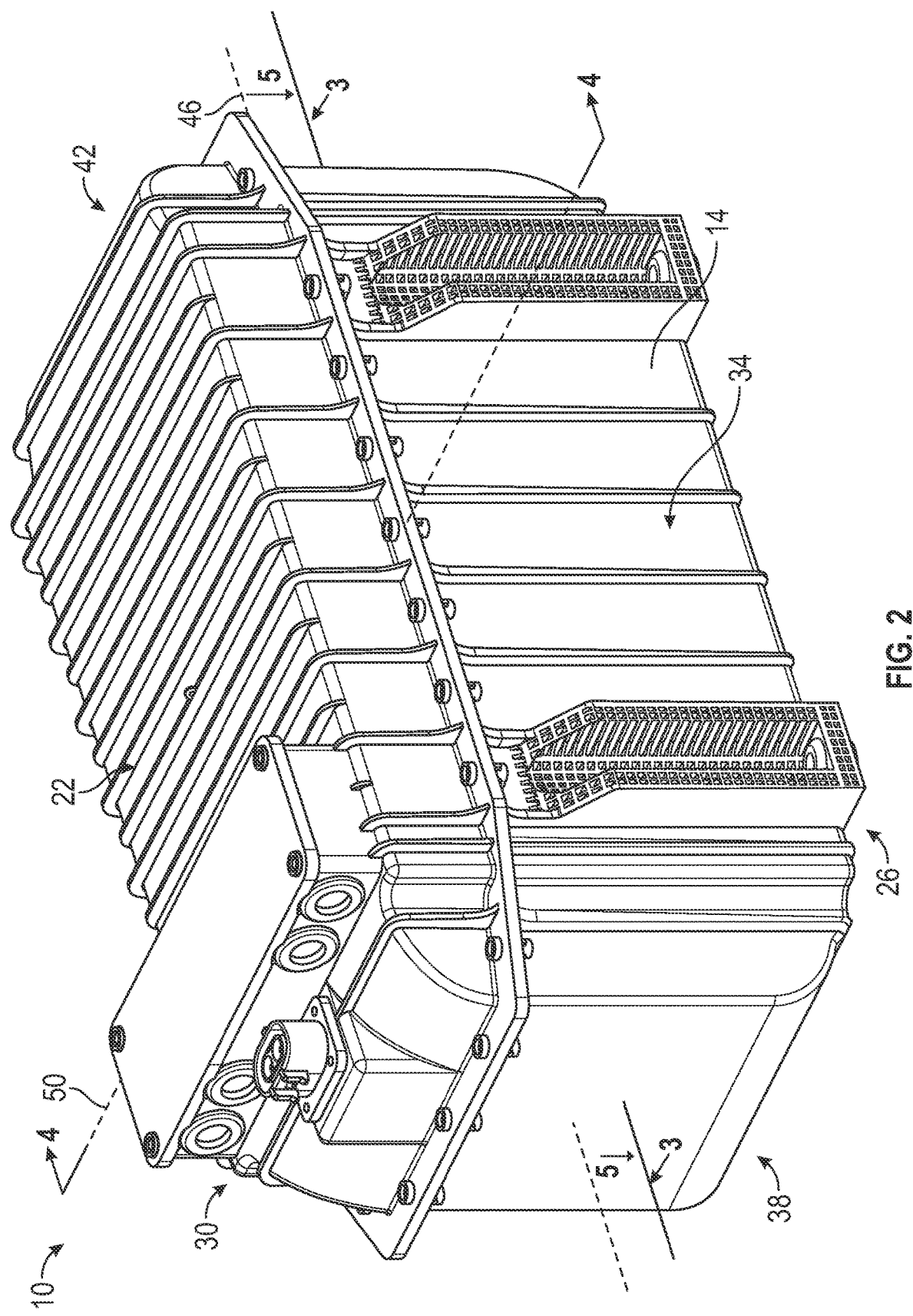
FIG. 2 is a perspective view of a battery pack assembly of the power supply of FIG. 1.

With continued reference to FIG. 11, the first fingers 152*a* are connected by wires 140 to the negative terminals 124 of each adjacent battery cell 62, and the second fingers 152*b* are connected by wires 140 to the positive terminals 120 of each adjacent battery cell 62. For two adjacent bus bars 66, the first fingers 152*a* of one bus bar 66 are aligned with the second fingers 152*b* of the adjacent bus bar 66 along a direction of the longitudinal axis 46 (FIG. 2). As such, the first fingers 152*a* of the one bus bar 66 extend away from the second fingers 152*b* of the adjacent bus bar 66, and the second fingers 152*b* of the one bus bar 66 extend toward the first fingers 152*a* of the adjacent bus bar 66.

Referring back to FIGS. 6 and 7, each battery cell assembly 18 includes primary bus bars 66*a*, 66*b* located at each longitudinal end (i.e., one at each end) of the first support member 102. The primary bus bar 66*a* extends along the lateral surface 116 of the first support member 102 near a front edge thereof adjacent the first end 38 of the housing 14 and connects to the main positive or negative terminal 126 or 127 of the battery pack assembly 10. The primary bus bar 66*b* extends along the lateral surface 116 of the first support member 102 near a rear edge thereof adjacent the second end 42 of the housing 14 and connects to an intermediate positive or negative terminal 164 or 168 of the battery cell assembly 18. For the battery cell assembly 18 having the main positive terminal 126, the primary bus bar 66*a* connects to the positive terminals 120 of the adjacent battery cells 62 (via the wires 140) and the primary bus bar 66*b* connects to the negative terminals 124 of the adjacent battery cells 62. Conversely, for the battery cell assembly 18 having the main negative terminal 127, the primary bus bar 66*a* connects to the negative terminals 124 of the adjacent battery cells 62 and the primary bus bar 66*b* connects to the positive terminals 120 of the adjacent battery cells 62.

In addition to connecting the fingers 152*a*, 152*b* to the battery cells 62 as described above, the wires 140 can also be bonded to other components to form additional electrical connections within the battery pack assembly 10. For example, the wires 140 can also connect each bus bar 66 to the voltage sensing PCB 136. In the same or other embodiments, the wires 140 can form one or more electrical connections between the voltage sensing PCB 136 and the main PCB 94. In addition, the wires 140 can connect the primary bus bars 66*b* of the two battery cell assemblies 18 to each other to electrically connect the two battery cell assemblies 18 to one another. In some embodiments, the wires 140 can form a fusible connection between the two primary bus bars 66*b*. By utilizing the wires 140 to form other electrical connections in the battery pack assembly 10 in addition to the connections between the bus bars 66 and the battery cells 62, manufacturing efficiency is improved.

Figure 15:
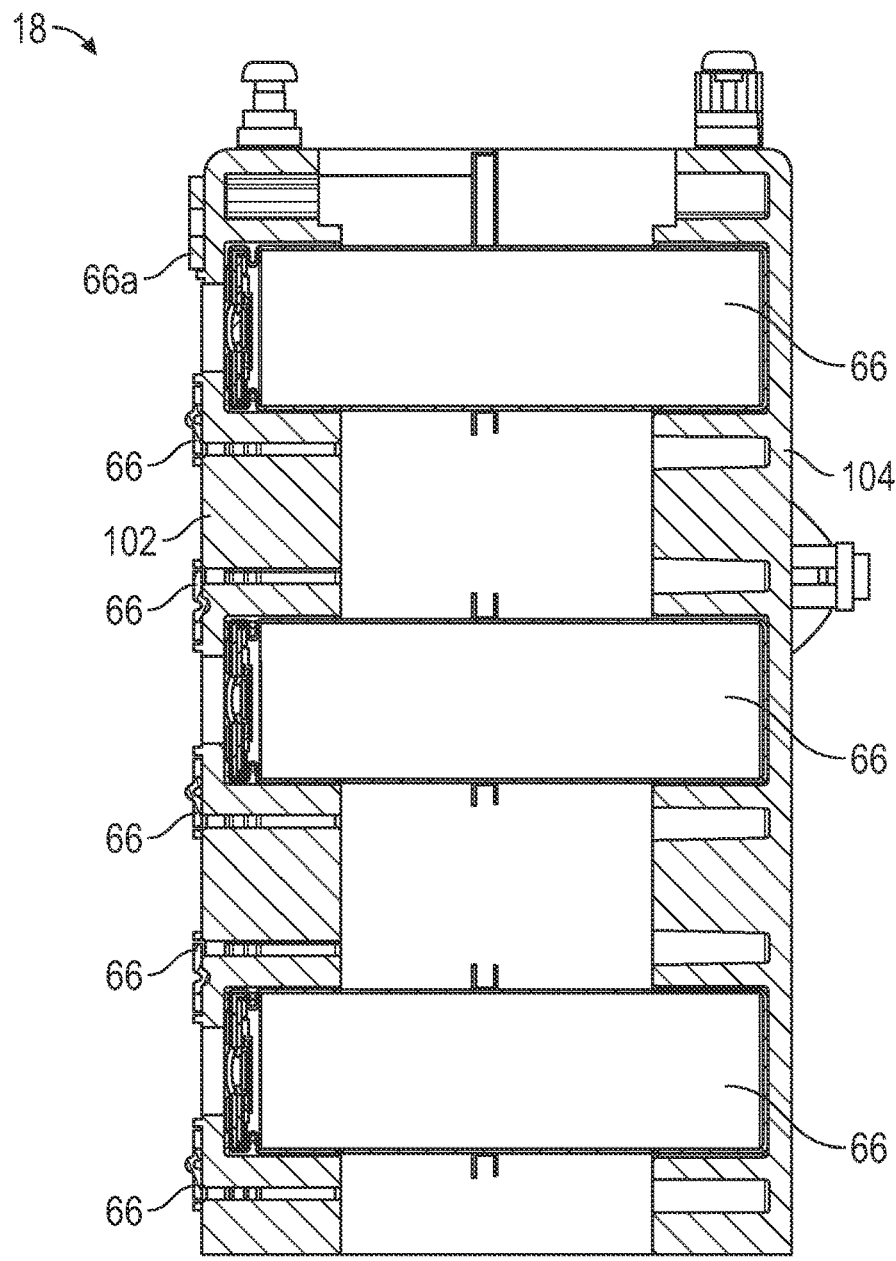
FIG. 15 is a partial cross-sectional view of the battery cell assembly of FIG. 8 according to one embodiment, taken along lines 15-15 of FIG. 11.
Figure 16:
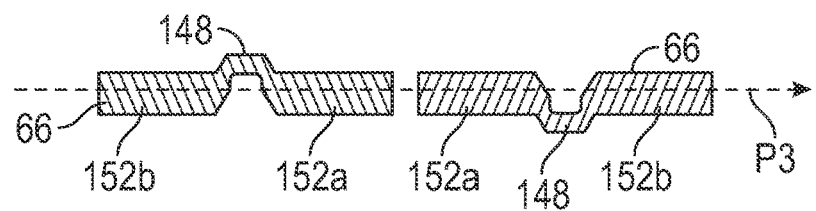
FIG. 16 is a schematic view of two adjacent bus bars according to the embodiment of FIG. 15.

FIGS. 15 and 16 illustrate an embodiment of the battery cell assemblies 18 in which the bus bars 66 are arranged to alternatingly face toward or away from the lateral surface 116 of the first support member 102 when moving along a direction of the longitudinal axis 46. More specifically, for two adjacent bus bars 66, one of the adjacent bus bars 66 is oriented with the base 148 closer to the lateral surface 116 than the fingers 152*a*, 152*b*, and the other of the adjacent bus bars 66 is oriented with the fingers 152*a*, 152*b* closer to the lateral surface 116 than the base 148. In addition, as illustrated schematically in FIG. 16, each pair of two adjacent bus bars 66 of the battery cell assemblies 18 is arranged with the fingers 152*a*, 152*b* of both bus bars 66 aligned along a flat plane P3. In other words, the fingers 152*a*, 152*b* of all of the bus bars 66 are arranged in-plane with one another and the bases 148 are arranged out of plane with one another. In other embodiments (not shown), the fingers 152*a*, 152*b* can still be arranged in-plane with one another but the bus bars 66 can each face the same direction, e.g., such that each of the bases 148 are adjacent the lateral surface 116, or each of the fingers 152*a*, 152*b* is adjacent the lateral surface 116.

Figure 17:
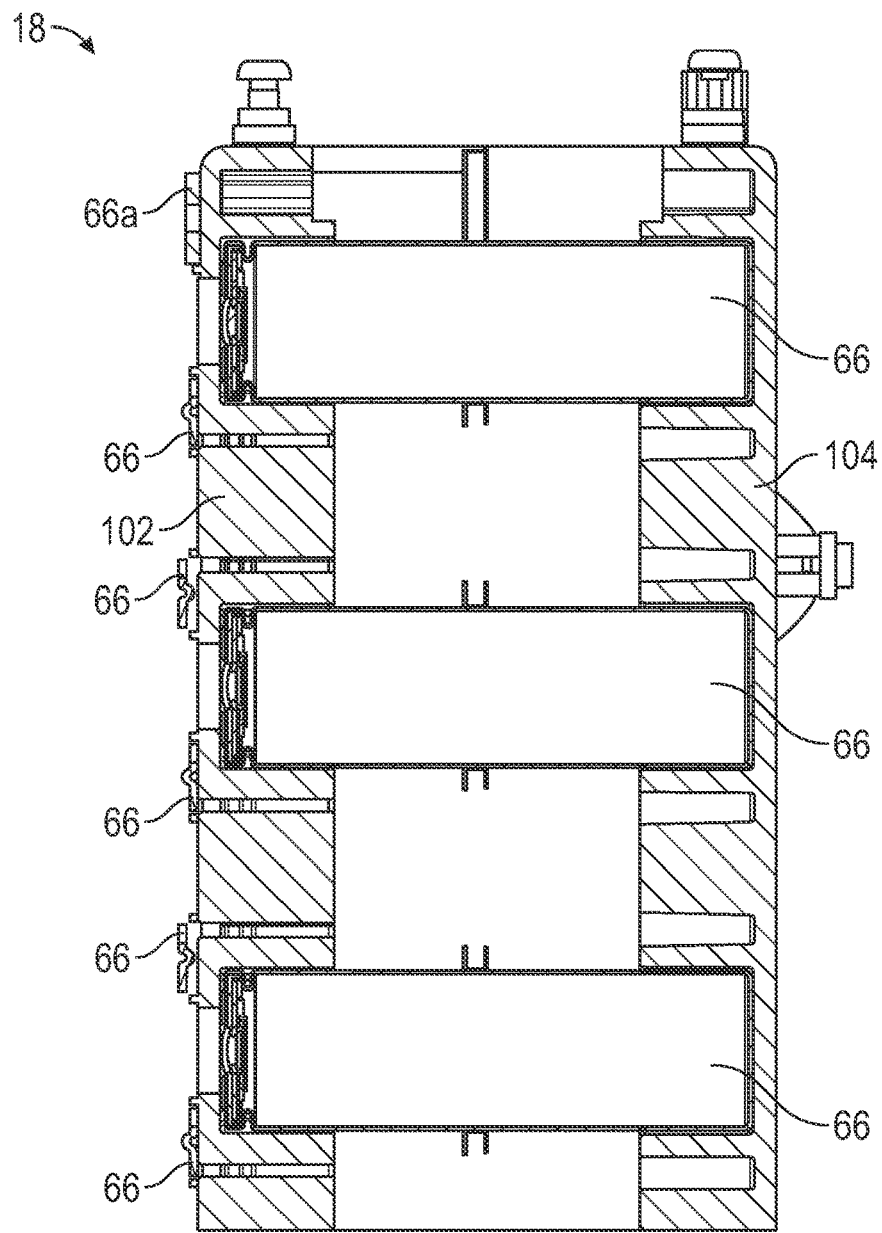
FIG. 17 is a partial cross-sectional view of the battery cell assembly of FIG. 8 according to another embodiment, taken along lines 15-15 of FIG. 11.
Figure 18:
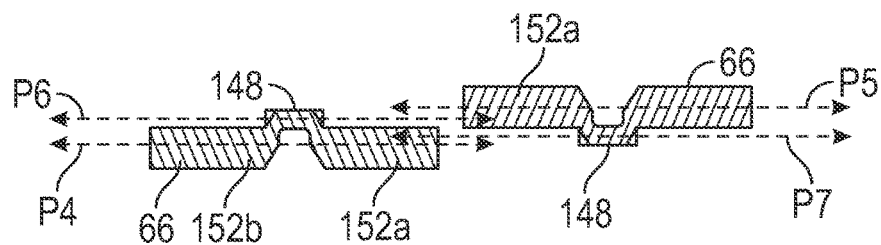
FIG. 18 is a schematic view of two adjacent bus bars according to the embodiment of FIG. 17.

FIGS. 17 and 18 illustrate another embodiment of the battery cell assemblies 18 similar to the embodiment of FIGS. 15 and 16, except that the fingers 152*a*, 152*b* of adjacent bus bars 66 are arranged out-of-plane with each other. Specifically, like the embodiment of FIGS. 15 and 16, the bus bars 66 of the embodiment of FIGS. 17 and 18 are arranged to alternatingly face toward or away from the lateral surface 116 of the first support member 120. But unlike the embodiment of FIGS. 15 and 16, the bus bars 66 of the embodiment of FIGS. 17 and 18 are arranged so that adjacent bus bars 66 have their fingers 152*a*, 152*b* located out-of-plane with each other. Similarly, the bases 148 of the adjacent bus bars 66 are also arranged out-of-plane with each other. The fingers 152*a*, 152*b* of the one bus bar 66 are centered about a fourth plane P4, the fingers 152*a*, 152*b* of the adjacent bus bar 66 are centered about a fifth plane P5, the base 148 of the one bus bar 66 is centered about a sixth plane P6, and the base 148 of the adjacent bus bar 66 is centered about a seventh plane P7, where each of the planes P4, P5, P6, and P7 are parallel to each other and offset from one another.

Figure 19:
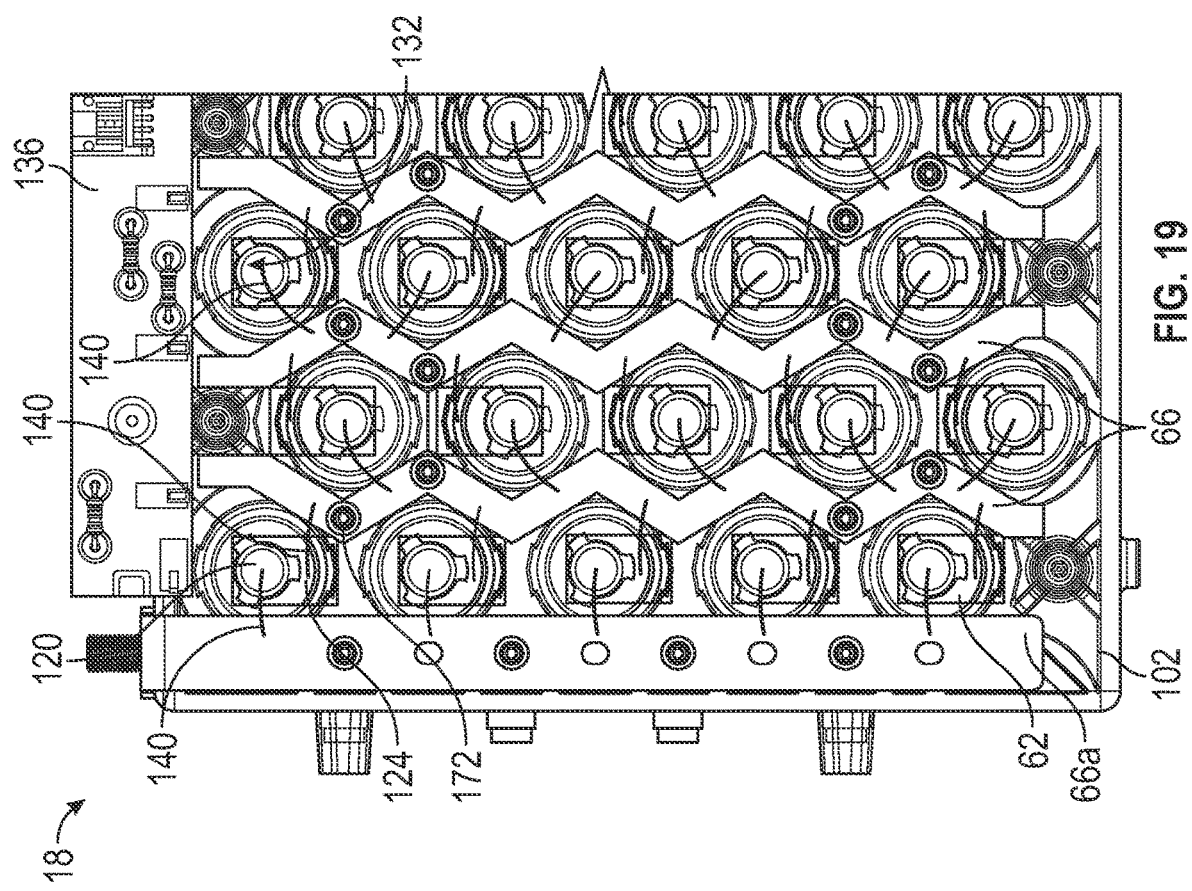
FIG. 19 is a partial side view of the battery cell assembly of FIG. 8 according to another embodiment.

FIG. 19 illustrates another embodiment of the battery cell assemblies 18 in which the bus bars 66 are formed having a non-linear shape. Specifically, the bus bars 66 are formed having a zig-zag shape and do not include any fingers. The zig-zag bus bars 66 are positioned between adjacent columns of the battery cells 62, and adjacent zig-zag bus bars 66 are alternatingly arranged such that bent portions 172 of the bus bars 66 alternatingly protrude toward each other and away from each other.

Figure 20:
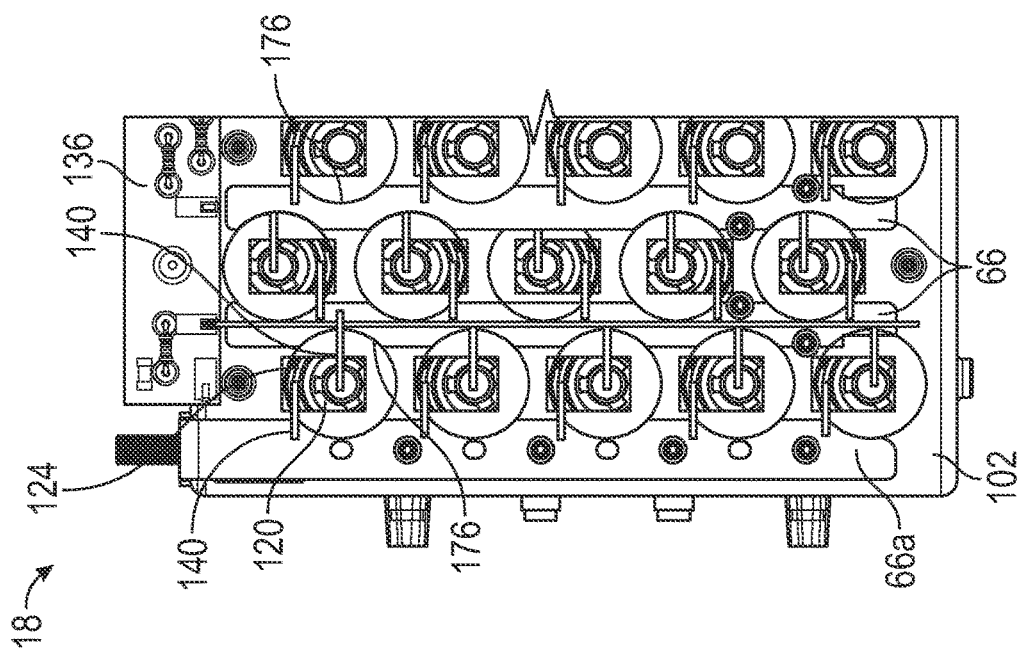
FIG. 20 is a partial side view of the battery cell assembly of FIG. 8 according to another embodiment.

FIG. 20 illustrates another embodiment of the battery cell assemblies 18 in which the bus bars 66 are formed having a non-linear shape. Specifically, the bus bars 66 include rounded cutouts 176 formed along each lateral side and corresponding to the outside diameter of the battery cells 62. The bus bars 66 are positioned between adjacent columns of the battery cells 62, and adjacent bus bars 66 are alternatingly arranged such that the rounded cutouts 176 of the bus bars 66 alternatingly face toward each other and away from each other.

Figure 21:
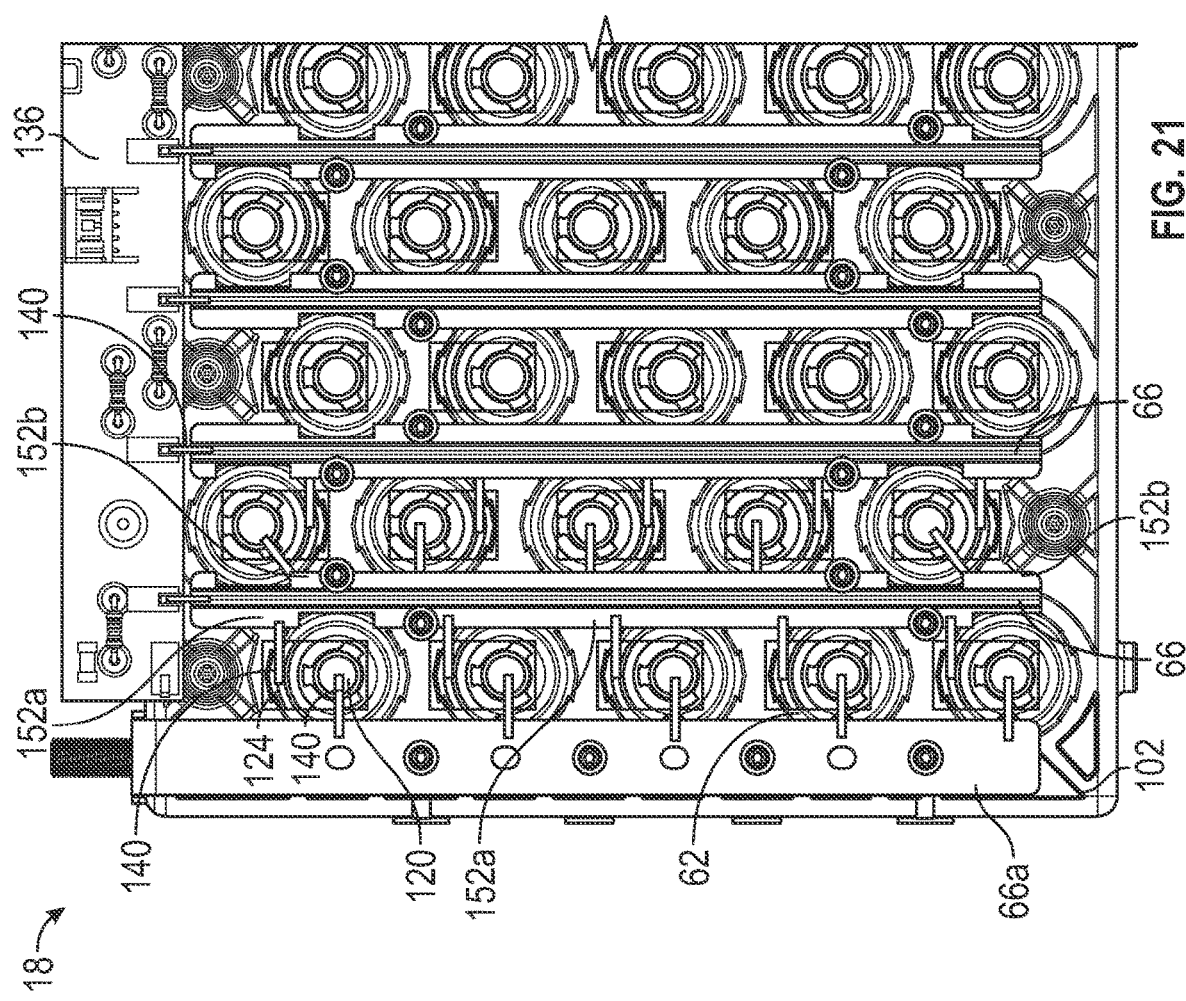
FIG. 21 is a partial side view of the battery cell assembly of FIG. 8 according to another embodiment.

FIG. 21 illustrates another embodiment of the battery cell assemblies 18 in which the bus bars 66 include fingers 152*a*, 152*b* having unequal widths. Specifically, the fingers 152*a*, 152*b* located toward the longitudinal ends of the bus bars 66 are relatively smaller in width and the fingers 152*a*, 152*b* located toward the longitudinal center of the bus bars 66 are relatively larger in width. The fingers 152a, 152b of a single bus bar 66 are misaligned with each other along a direction of the longitudinal axis 46 (FIG. 2).

Figure 22:
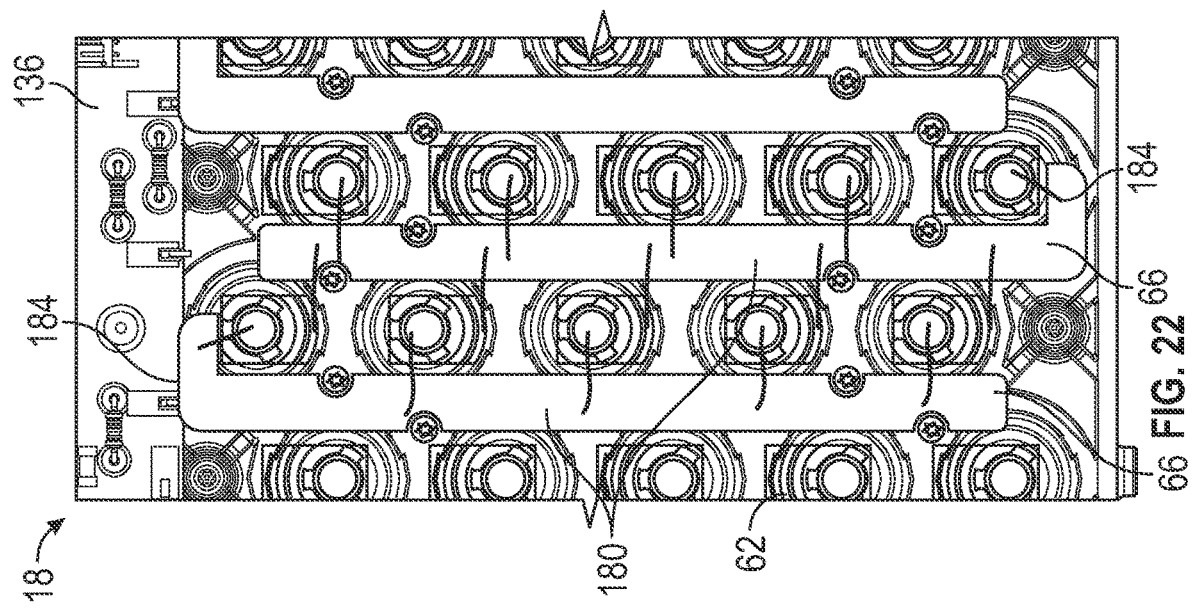
FIG. 22 is a partial side view of the battery cell assembly of FIG. 8 according to another embodiment.

FIG. 22 illustrates another embodiment of the battery cell assemblies 18 in which the bus bars 66 are formed having an "L" shape. The bus bars 66 include a longitudinally extending long leg 180 located between the columns of the battery cells 62 and a laterally extending short leg 184 protruding from one end of the bus bar 66. The bus bars 66 are alternatingly arranged with the short leg 184 of one bus bar 66 being located adjacent the voltage sensing PCB 136 and the short leg 184 of the next adjacent bus bar 66 being distant from the voltage sensing PCB 136.

FIG. 23 schematically illustrates another embodiment of the battery cell assemblies 18 in which the fingers 152a, 152b of each bus bar 66 are staggered relative to each other and are spaced by alternating short and long intervals along a longitudinal direction of the bus bar 66. Moreover, adjacent bus bars 66 are horizontally "flipped" relative to one another, resulting in each of the second fingers 152b being horizontally aligned with one another along a direction of the longitudinal axis 46 (FIG. 2) and each of the first fingers 152a being horizontally misaligned. This arrangement results in the fingers 152a, 152b extending relatively closer toward the positive and negative terminals 120, 124 of the battery cells 62 and minimizes a length of the wires 140 for connecting the fingers 152a, 152b to the terminals 120, 124.

FIG. 24 schematically illustrates another embodiment of the battery cell assemblies 18 in which the fingers 152a, 152b of each bus bar 66 are staggered relative to each other and are spaced by alternating short and long intervals along a longitudinal direction of the bus bar 66. Moreover, adjacent bus bars 66 are horizontally "flipped" relative to one another. Moreover, the bus bars 66 vary in length and are vertically misaligned such that none of the fingers 152a, 152b are horizontally aligned with one another between adjacent bus bars 66 along a direction of the longitudinal axis 46 (FIG. 2).

Figure 25:
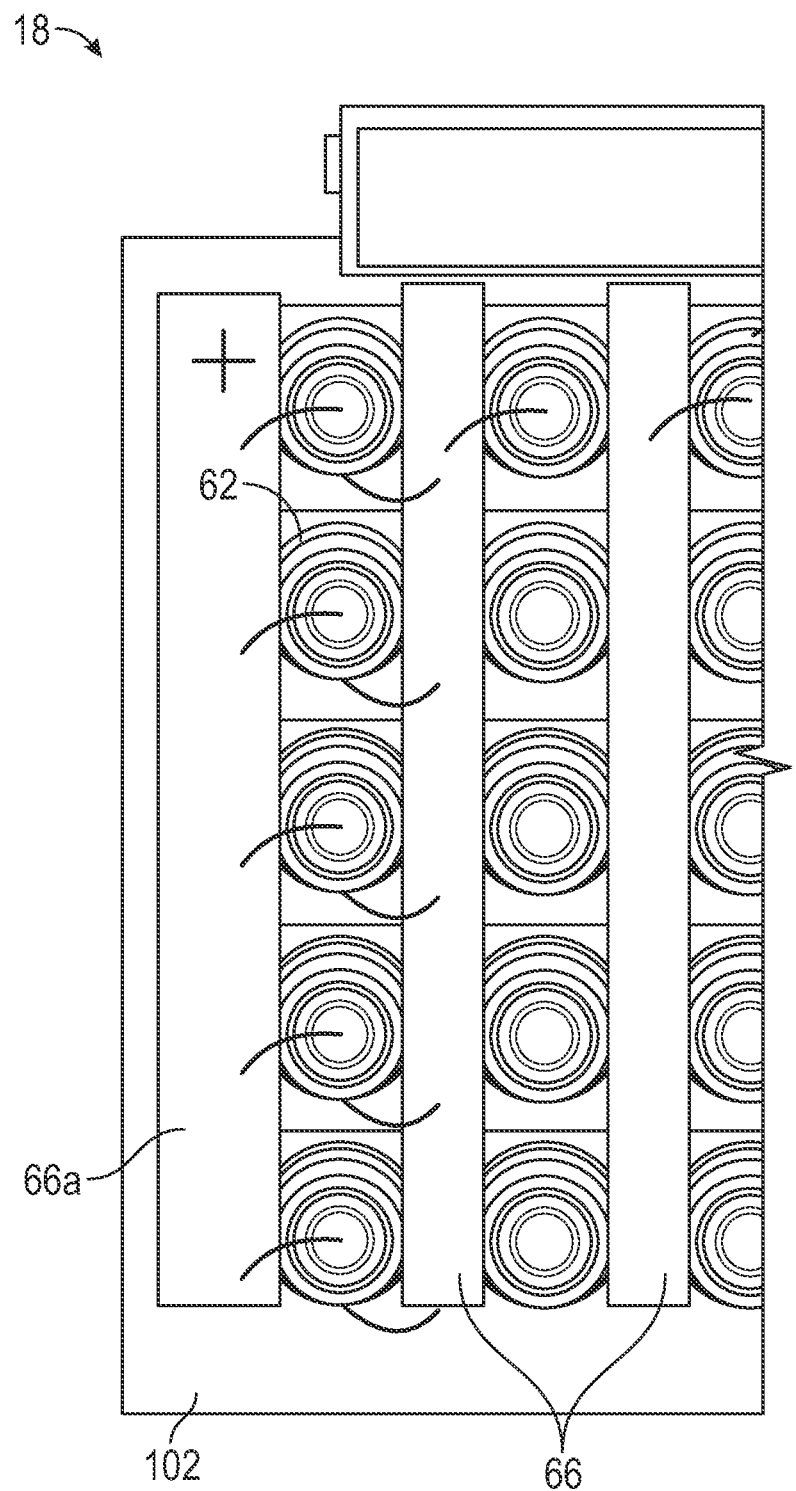
FIG. 25 is a partial side view of the battery cell assembly of FIG. 8 according to another embodiment.

FIG. 25 illustrates another embodiment of the battery cell assemblies 18 in which the bus bars 66 are formed as elongated flat linear bodies. Specifically, the bus bars 66 are rectangular and do not vary in width along their longitudinal length.

Figure 27:
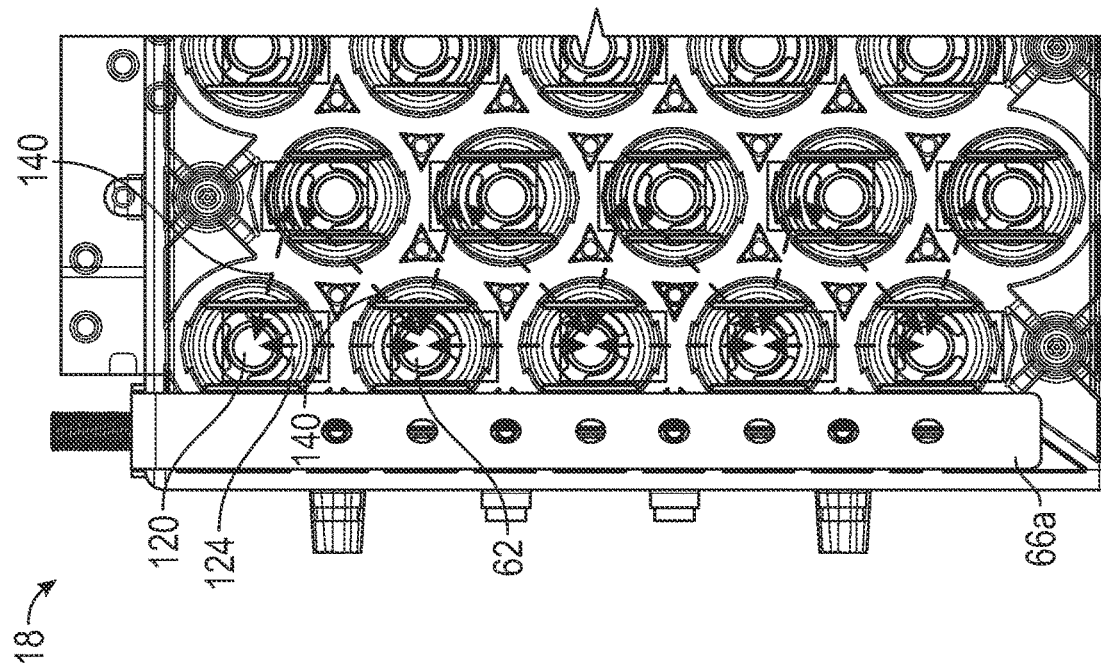
FIG. 27 is a partial side view of the battery cell assembly of FIG. 8 according to another embodiment.
Figure 26:
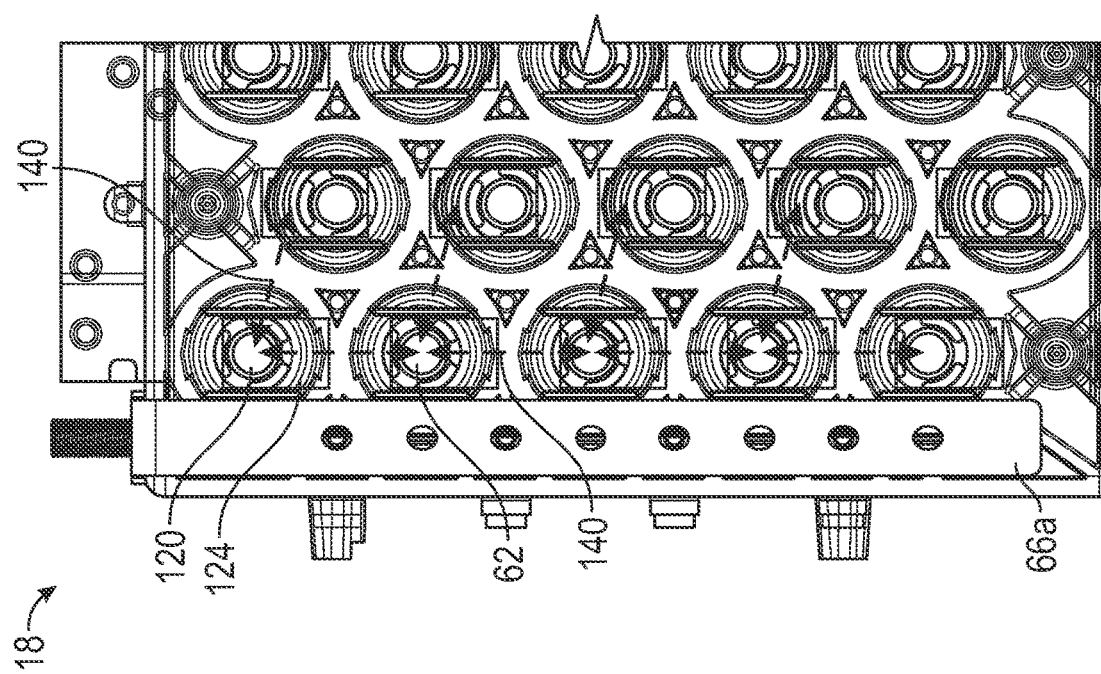
FIG. 26 is a partial side view of the battery cell assembly of FIG. 8 according to another embodiment.

FIGS. 26 and 27 schematically illustrate embodiments of the battery cell assemblies 18 in which only the primary bus bars 66a, 66b are provided (only primary bus bars 66a are shown). As such, the embodiments of FIGS. 26 and 27 do not include bus bars 66 between the columns of battery cells 62. Instead, the battery cells 62 are electrically connected to each other in a series/parallel arrangement by the wires 140 themselves, which are attached by wire bonding. Specifically, the wires 140 extend to connect the positive and negative terminals 120, 124 of the battery cells 62 to establish a series/parallel arrangement. The wires 140 also connect the positive terminals of the battery cells 62 in the last column to the primary bus bars 66a. In other embodiments (not shown), the primary bus bars 66a, 66b can also be omitted.

Figure 28:
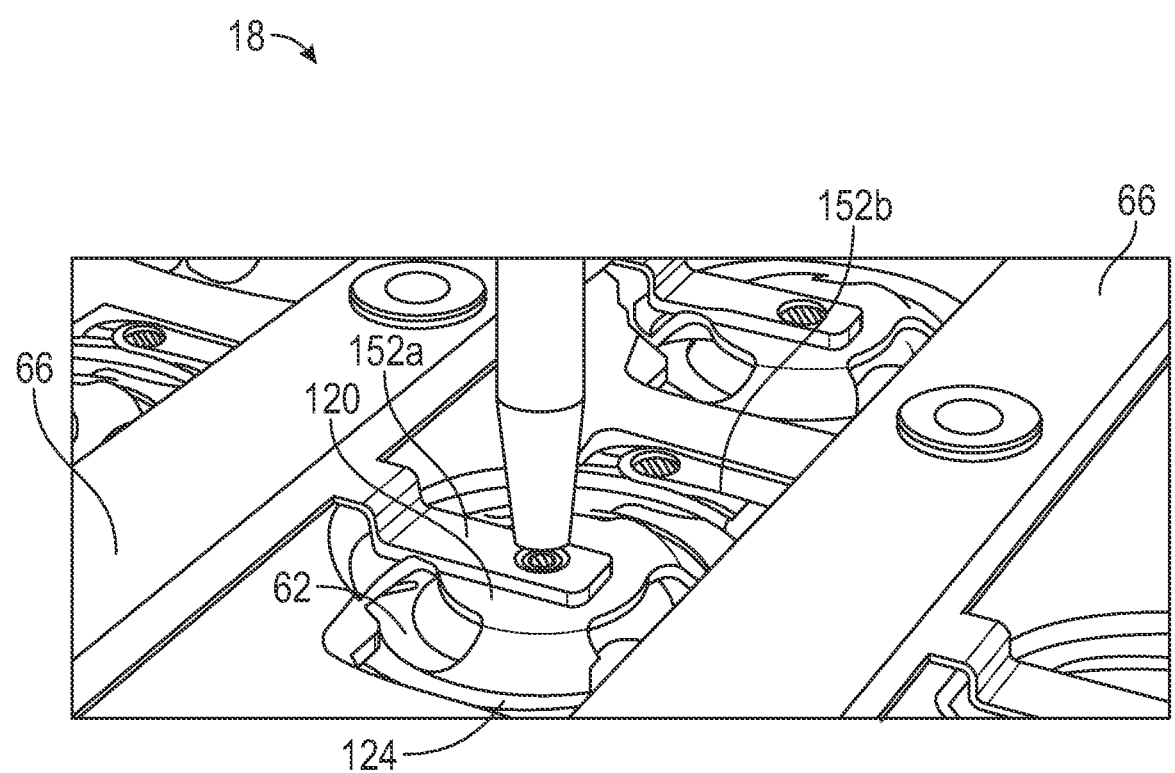
FIG. 28 is a partial side perspective view of the battery cell assembly of FIG. 8 according to another embodiment.
Figure 29:
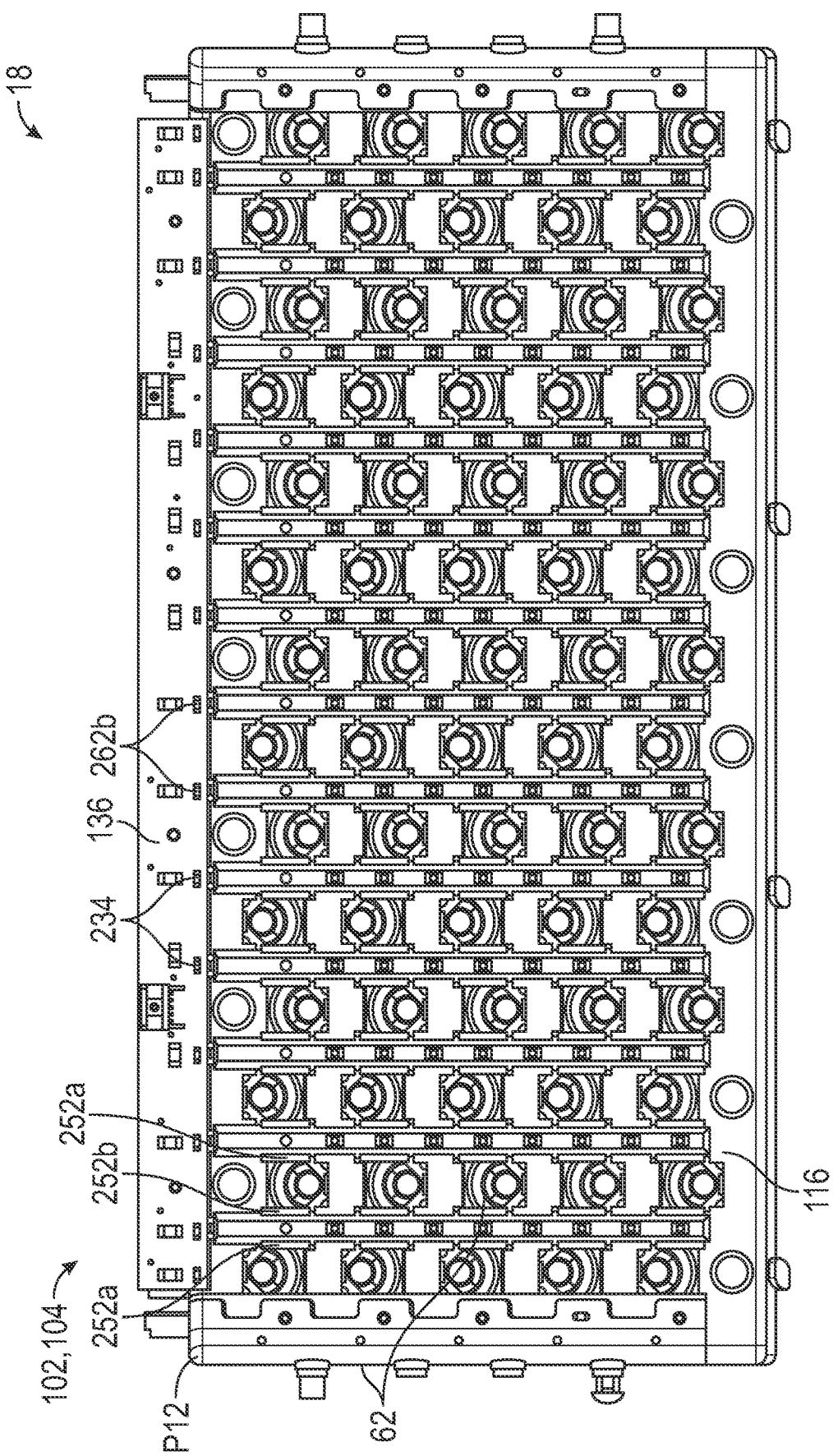
FIG. 29 is a side view of a battery cell assembly of FIG. 8 according to another embodiment, the battery cell assembly including a first support member, a plurality of bus bars, and a voltage sensing PCB.
Figure 30:
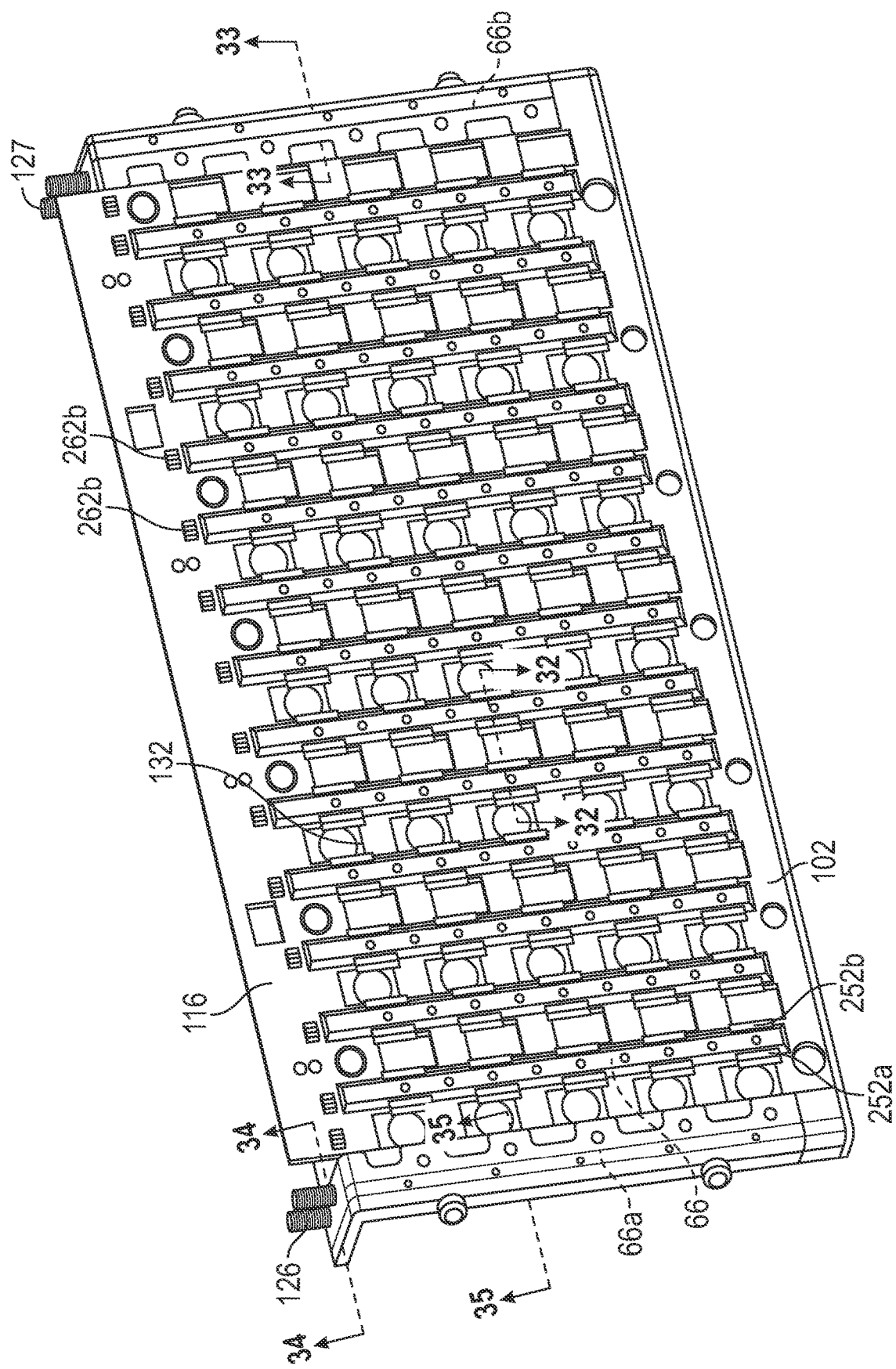
FIG. 30 is a perspective side view of a battery cell assembly of FIG. 29 with the voltage sensing PCB removed.

FIG. 28 illustrates another embodiment of the battery cell assemblies 18 in which the bus bars 66 include fingers 152a, 152b that are directly connected to the positive and negative terminals 120, 124 of the battery cells 62 by precision welding.

In some embodiments, such as that of FIGS. 5A-8, 11, and 19-25, the bus bars 66, 66a, 66b are coupled to the lateral surface 116 by fasteners 134. In some embodiments, such as that of FIGS. 29-47, the bus bars 66, 66a, 66b are insert molded within the first and second support members 102, 104 and are therefore coupled to the first and second support members 102, 104 without fasteners. It should be understood that the following discussion of the first support member 102 of FIGS. 29-47 and the bus bars 66, 66a, 66b coupled thereto of the battery assembly 18 has the same or similar features as the first support member 102 and the bus bars 66, 66a, 66b of the embodiments of the battery assemblies 18 above unless otherwise noted.

Figure 31:
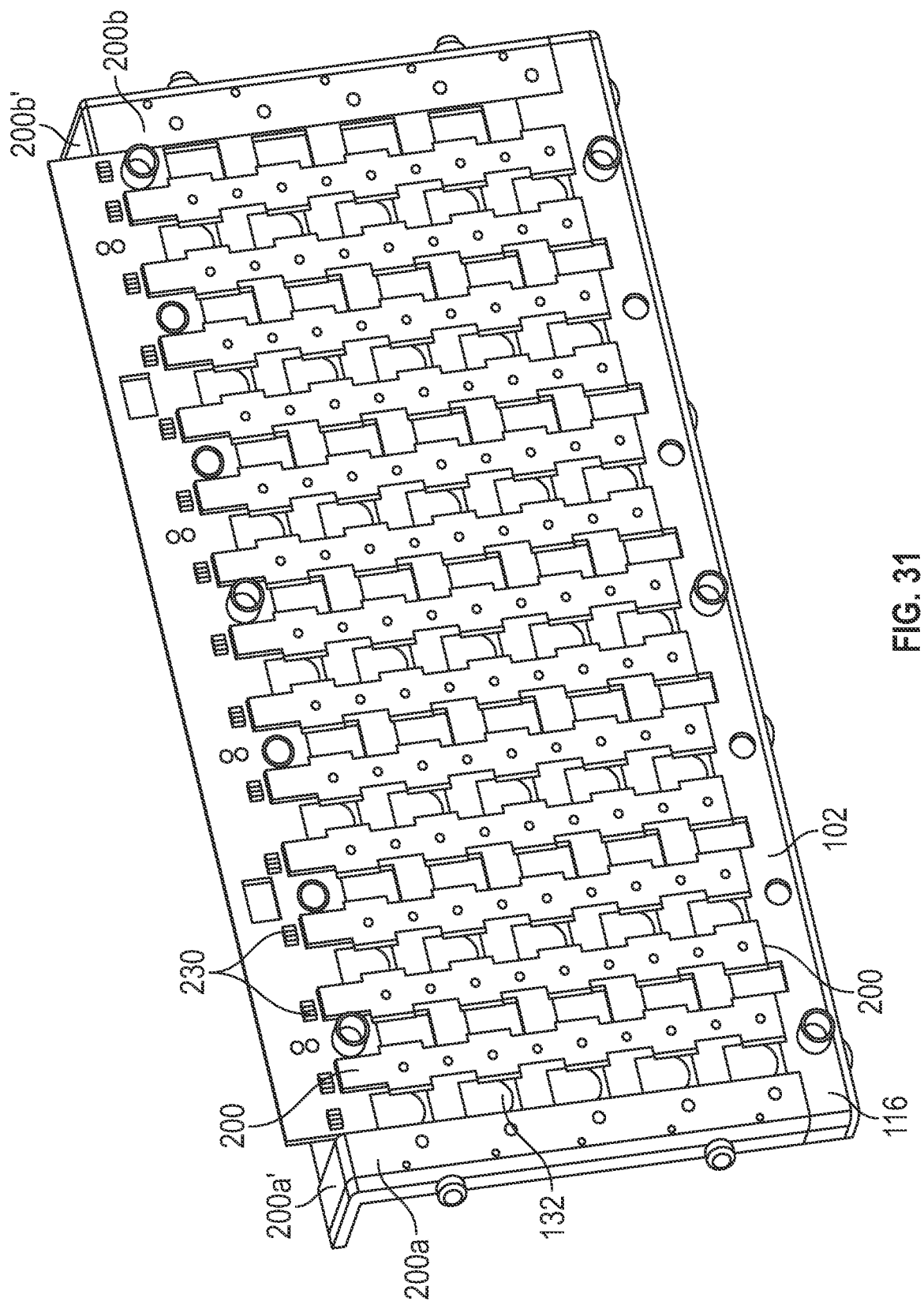
FIG. 31 is a perspective side view of a battery cell assembly of FIG. 29 with the plurality of bus bars and the voltage sensing PCB removed.
Figure 32:
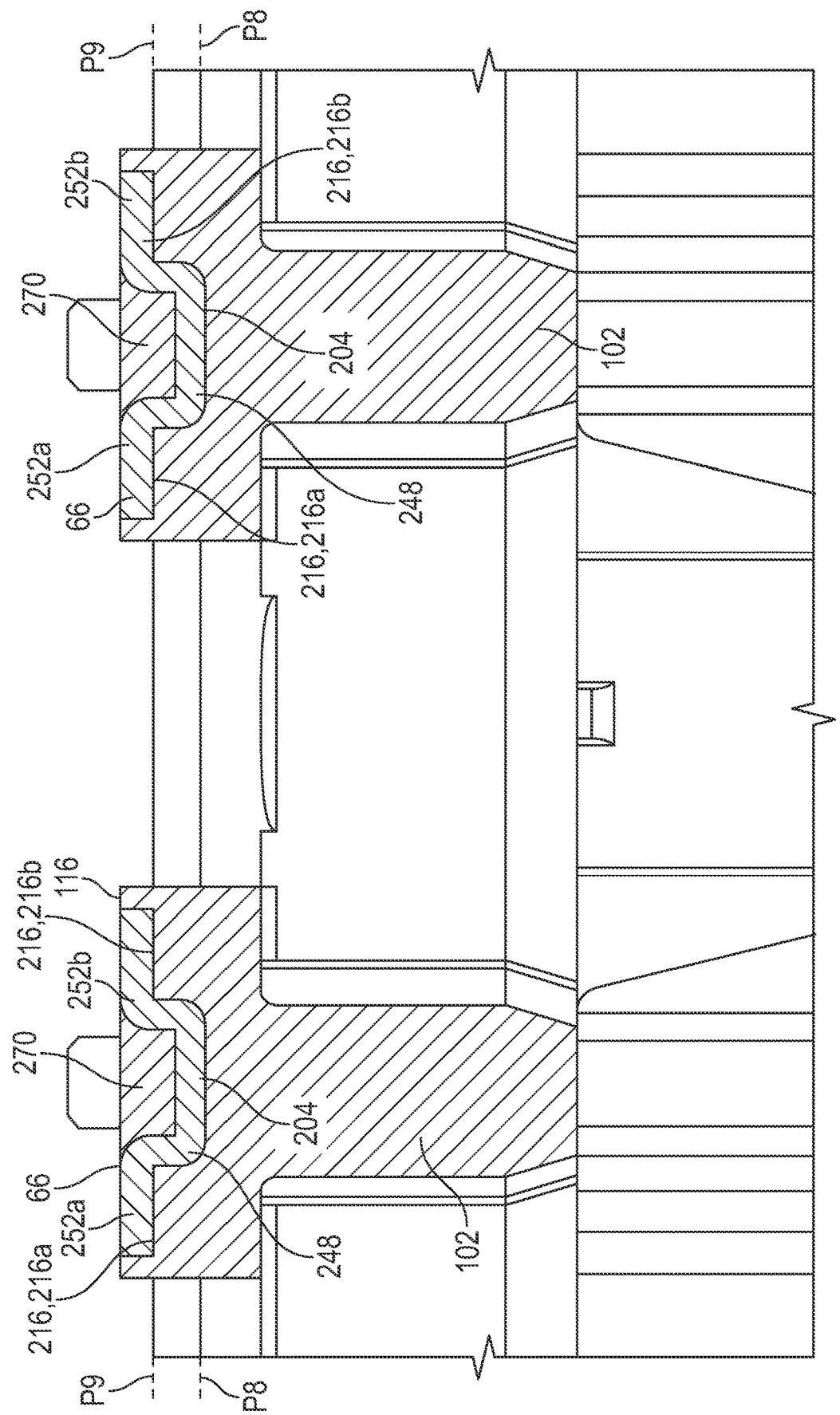
FIG. 32 is a cross-sectional view of the battery cell assembly of FIG. 29 along the line 32-32 of FIG. 30.
Figure 33:
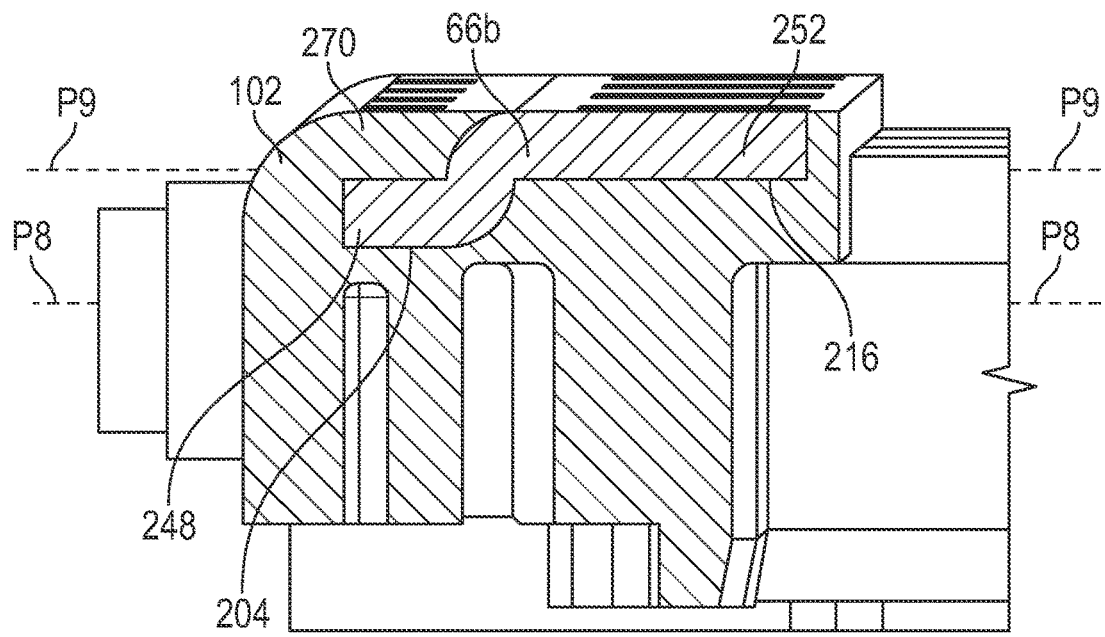
FIG. 33 is a cross-sectional view of the battery cell assembly of FIG. 29 along the line 33-33 of FIG. 30.
Figure 34:
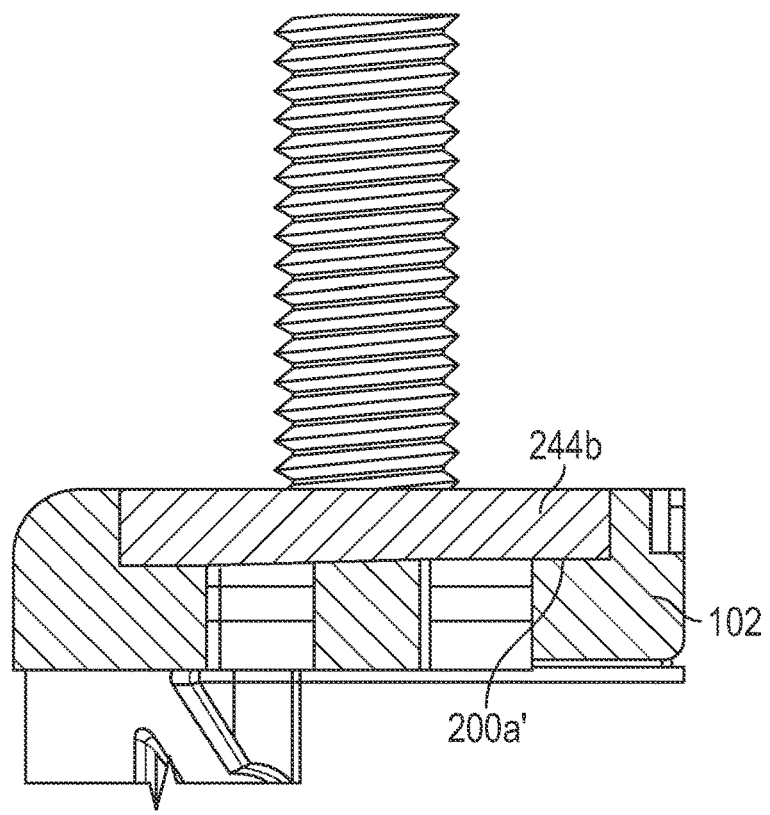
FIG. 34 is a cross-sectional view of the battery cell assembly of FIG. 29 along the line 34-34 of FIG. 30.
Figure 35:
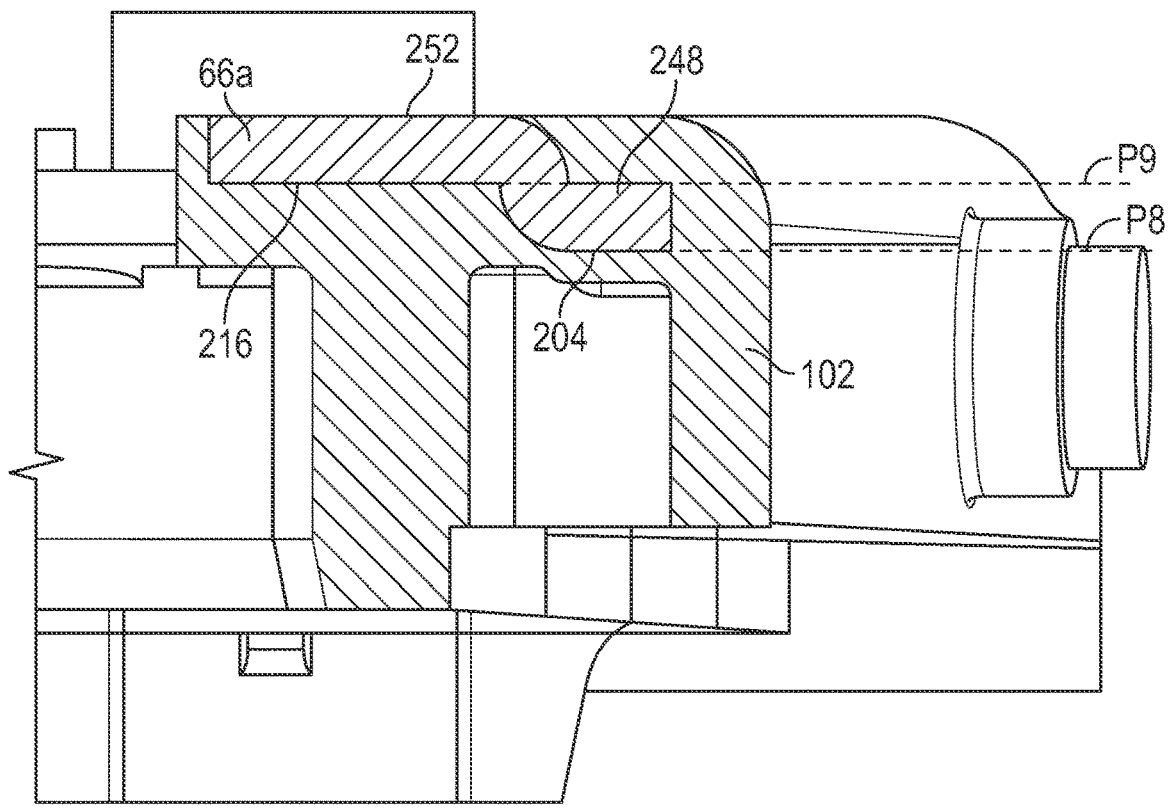
FIG. 35 is a cross-sectional view of the battery cell assembly of FIG. 29 along the line 35-35 of FIG. 30.
Figure 36:
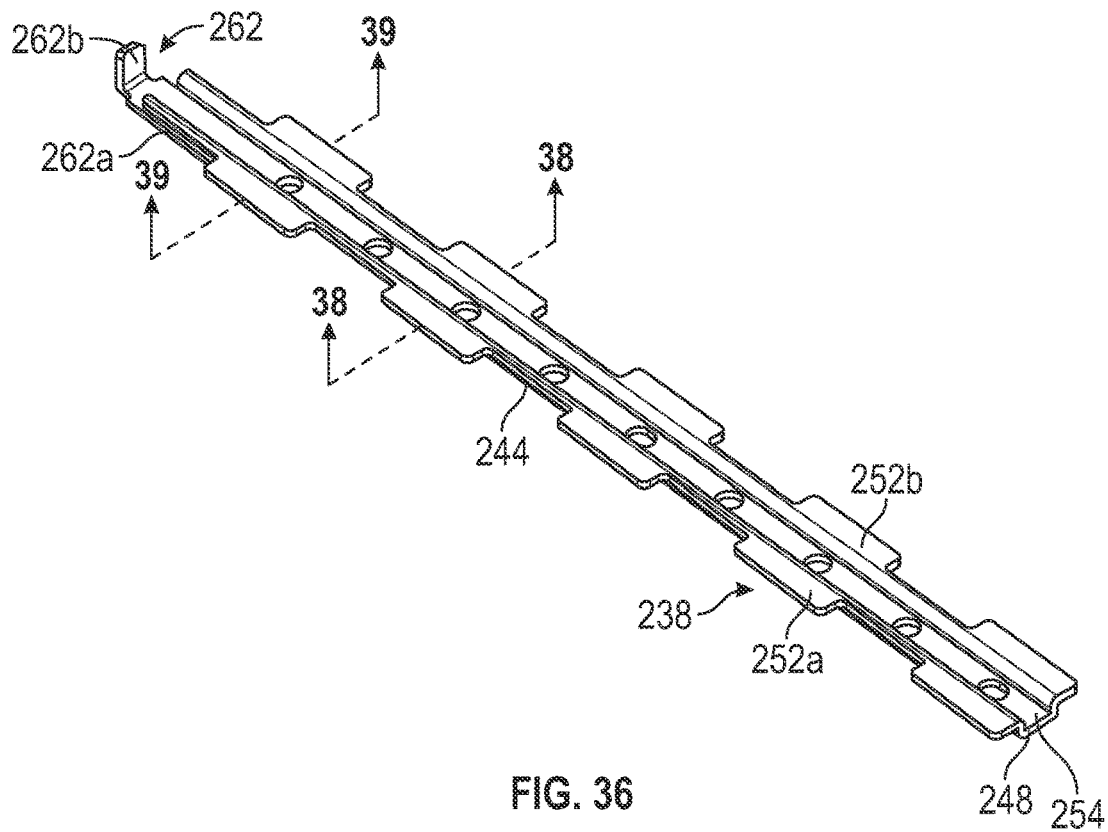
FIG. 36 is a perspective view of one of the plurality of bus bars of FIG. 29.
Figure 37:
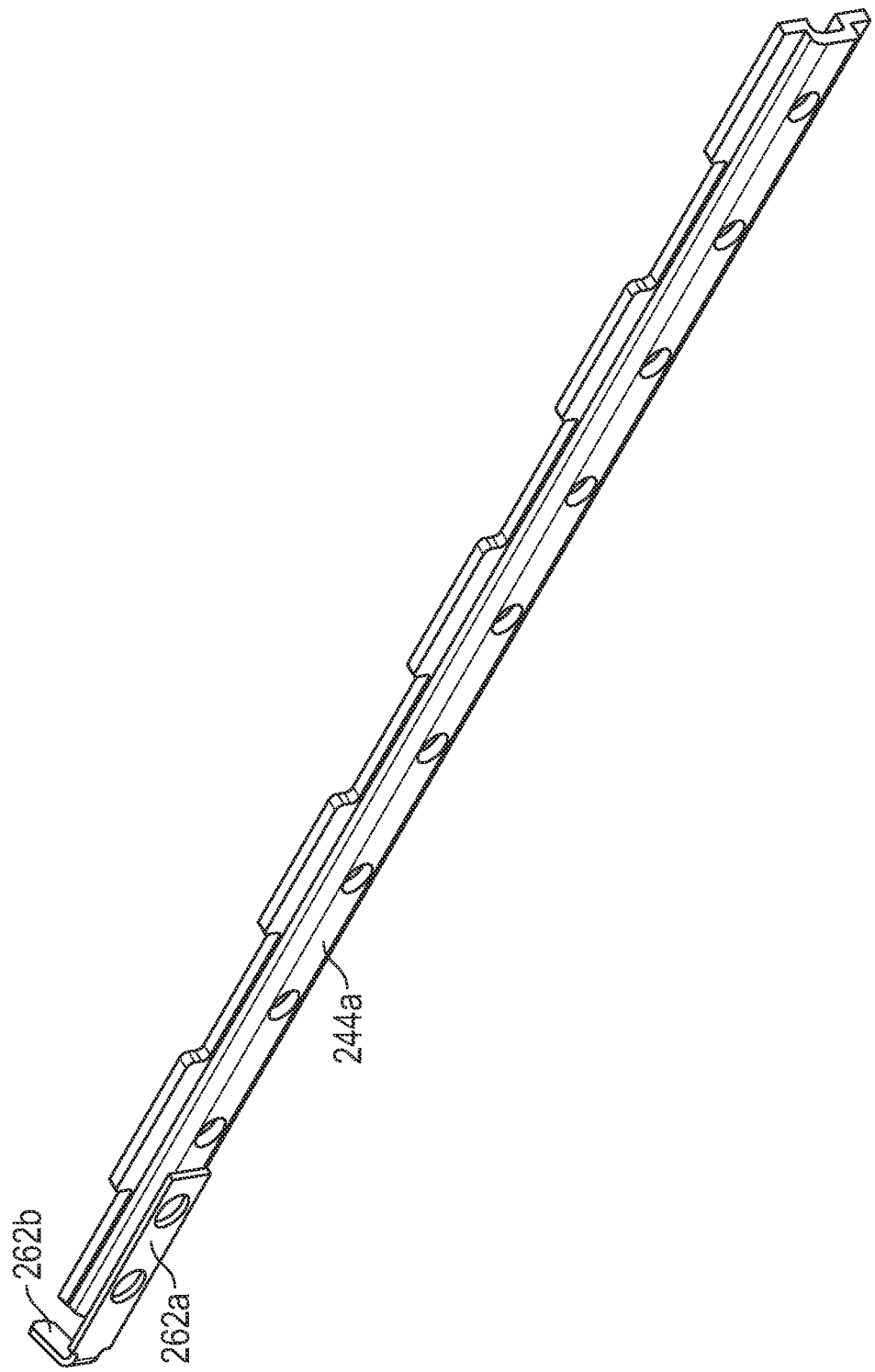
FIG. 37 is another perspective view of the of bus bar of FIG. 36.

As shown in FIG. 31 with respect to the first support member 102, the lateral surface 116 has a plurality of elongate recesses 200 that extend in vertical direction along the lateral surface 116 and are positioned between each column of recesses 108. The elongate recesses 200 are configured to receive the bus bars 66, 66a, 66b. As shown in FIG. 32, the elongate recesses 200 each have a first portion 204 with a lowermost surface that defines a first plane P8 and a second portion 216 with a lowermost surface that defines a second plane P9. The second plane P9 is parallel to and offset from the first plane P8. The middle bus bars 66 include a second portion 216a positioned adjacent one of the adjacent column of recesses 108 and a second portion 216b positioned adjacent the other of the adjacent column of recesses 108. In the illustrated embodiments, the second portions 216a, 216b are aligned and therefore have lowermost surfaces within the same plane P9. In other embodiments, the second portions 216a, 216b may be staggered or have other suitable configurations. The second portions 216 of the outer elongate recesses 200a, 200b (e.g., the front and rear elongate recesses 200 that extend adjacent to the front and rear edges) extend from one side of the first portion 204. As shown, the front elongate recess 200a has second portions 216 that are positioned adjacent the front-most column of recesses 108 and the rear elongate recess 200b has second portions 216 that are positioned adjacent the rear-most column of recesses 108. Additionally, the front elongate recess 200a includes a top recess portion 200a' and the rear elongate recess 200b includes a top recess portion 200b'. The top recess portions 200a', 200b' are positioned in the top surface of the first support member 102 adjacent the front and rear edges.

In some embodiments, a plurality of apertures 230 (FIG. 31) extends through the lateral surface 116 and are configured to align with corresponding apertures 234 (FIG. 29) in the voltage sensing PCB 136. The aligned apertures 230, 234 are configured to receive a portion of the bus bars 66, 66a, 66b, as discussed in greater detail below.

In the illustrated embodiment, there are thirteen middle bus bars 66, a first primary bus bar 66a, and a second primary bus bar 66b. In other embodiments, there may be more or fewer middle bus bars 66. Each of the bus bars 66, 66a, 66b has a shape that is complementary to the shape of the corresponding recess 200, 200a, 200b in which the bus bar 66, 66a, 66b is positioned.

Figure 38:
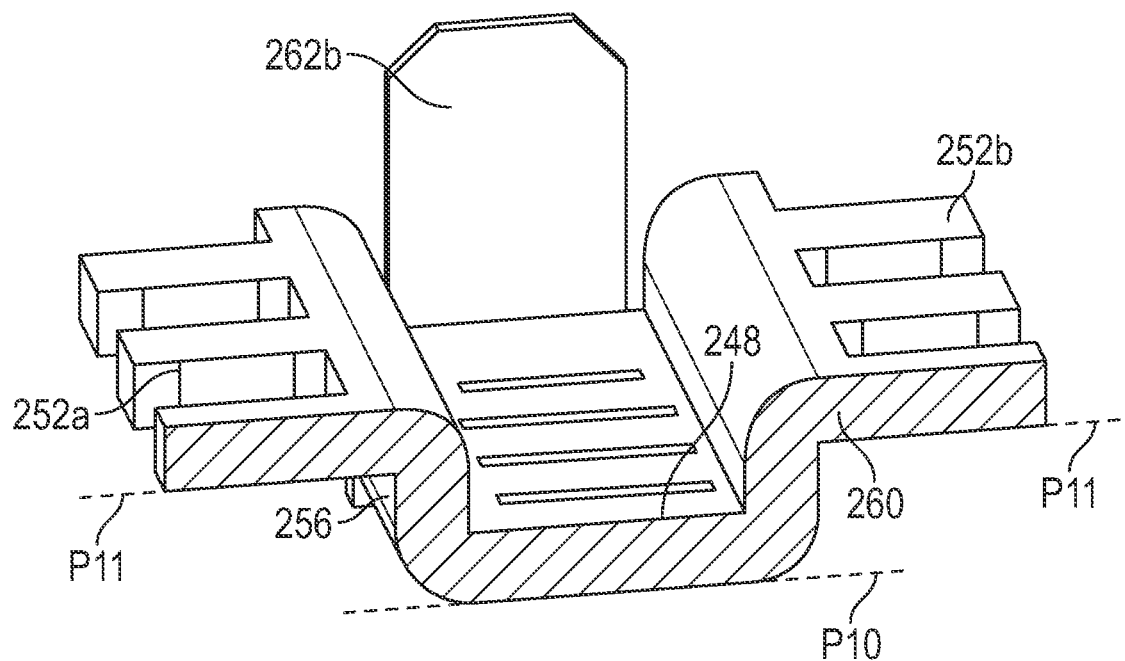
FIG. 38 is a cross-sectional view of the bus bar of FIG. 36 along the line 38-38 of FIG. 36.
Figure 39:
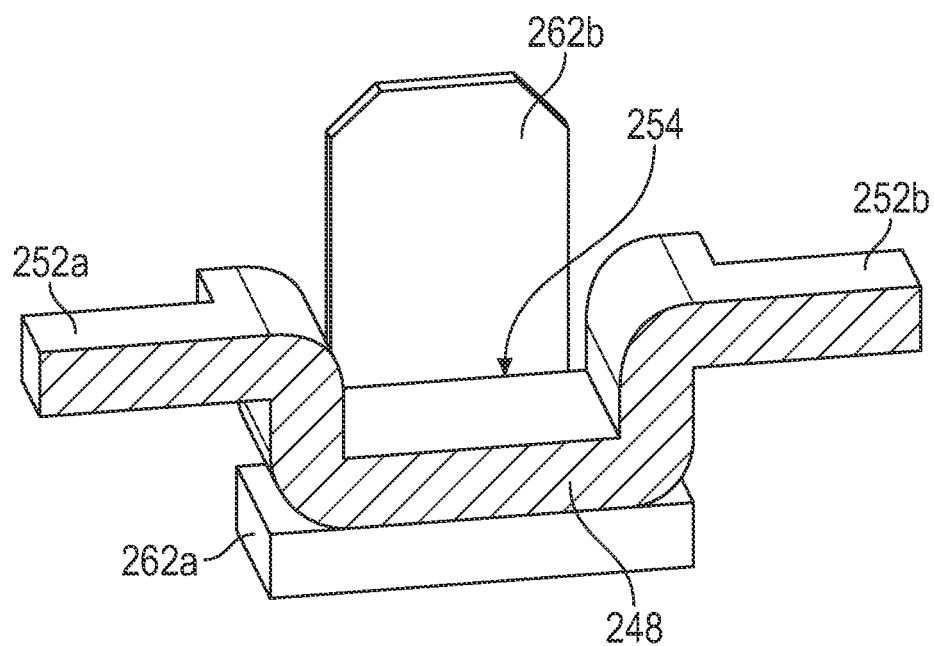
FIG. 39 is a cross-sectional view of the bus bar of FIG. 36 along the line 39-39 of FIG. 36.
Figure 40:
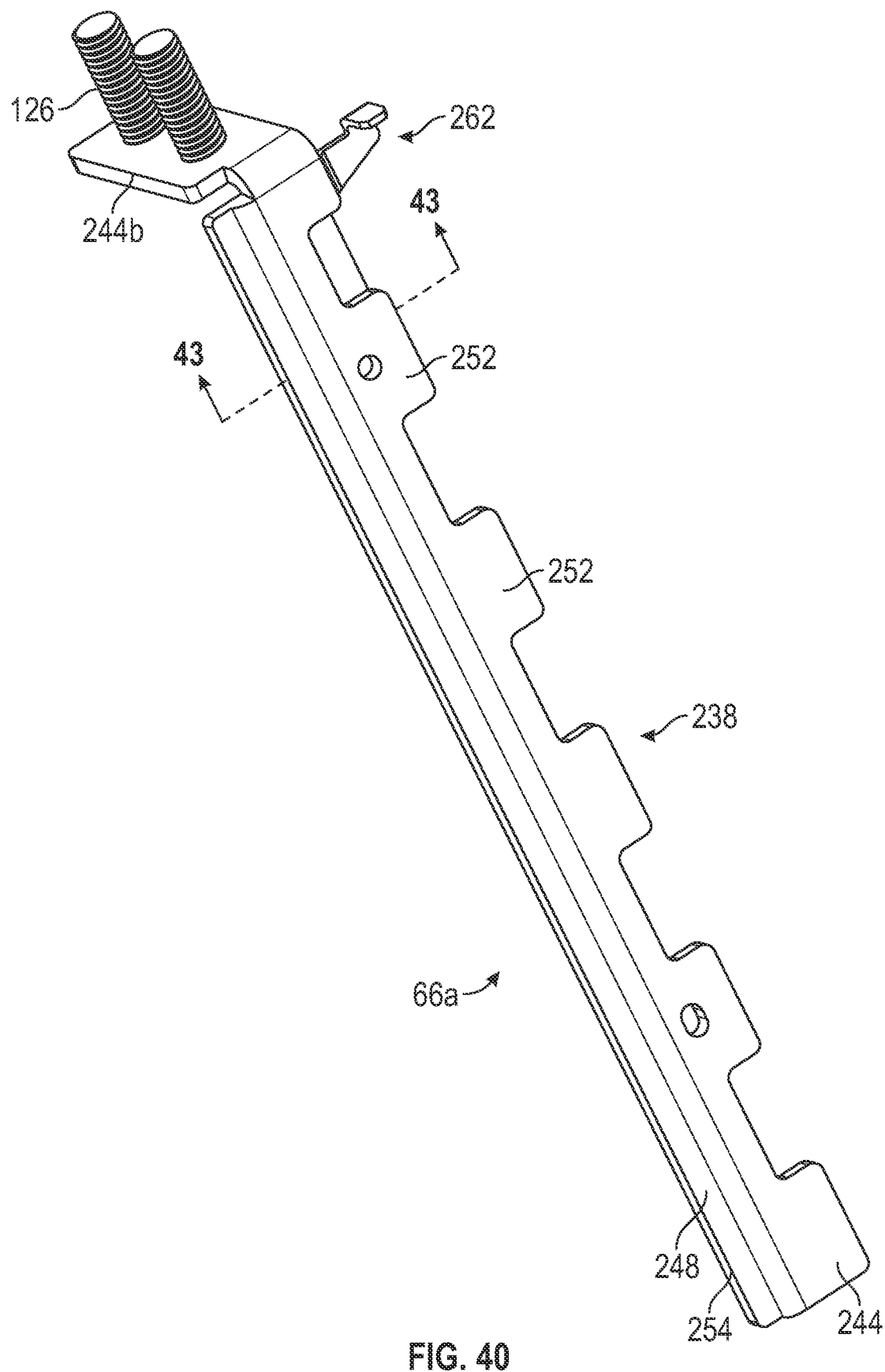
FIG. 40 is a perspective view of one of the plurality of bus bars of FIG. 29.
Figure 41:
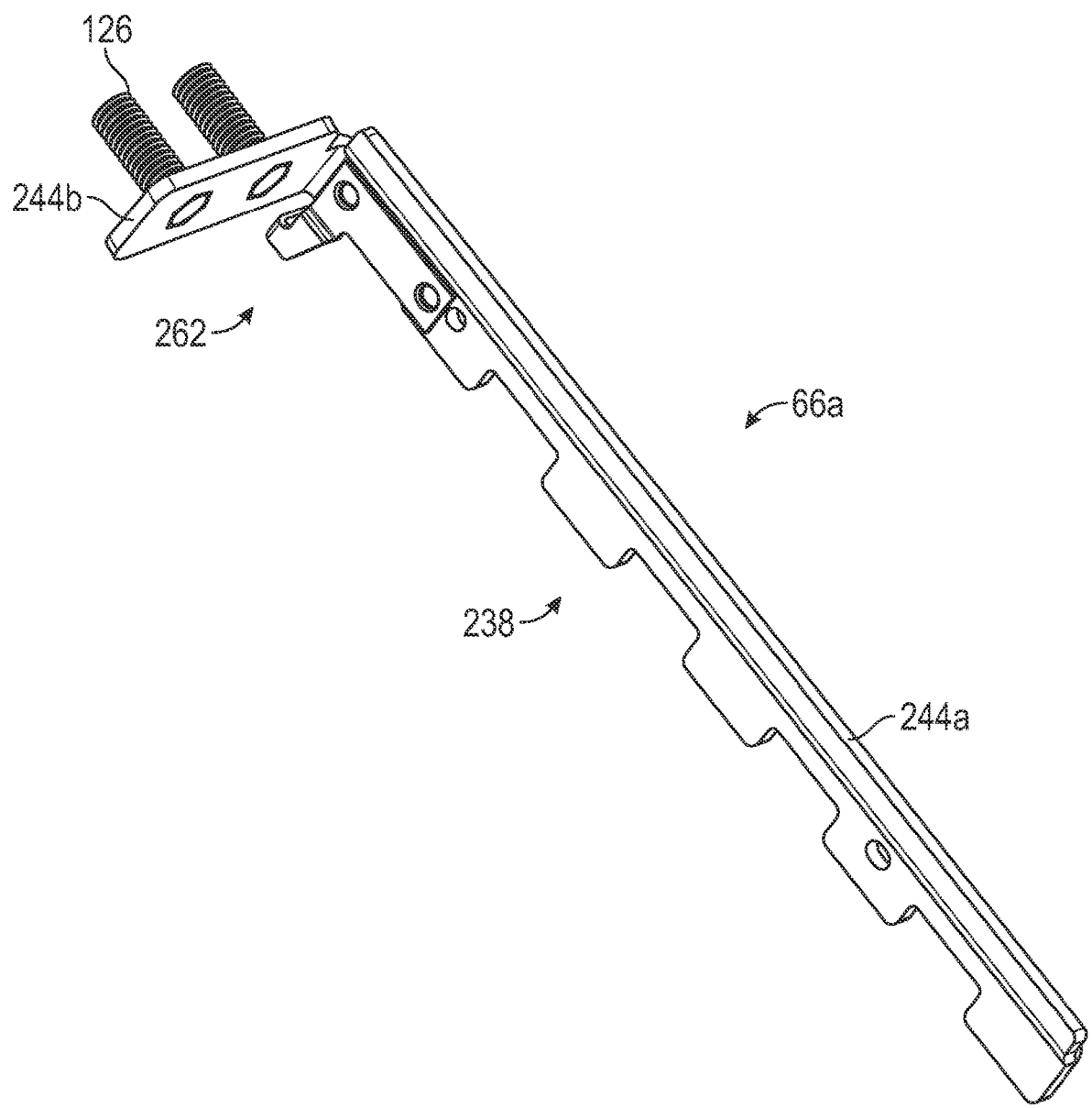
FIG. 41 is another perspective view of the of bus bar of FIG. 40.
Figure 42:
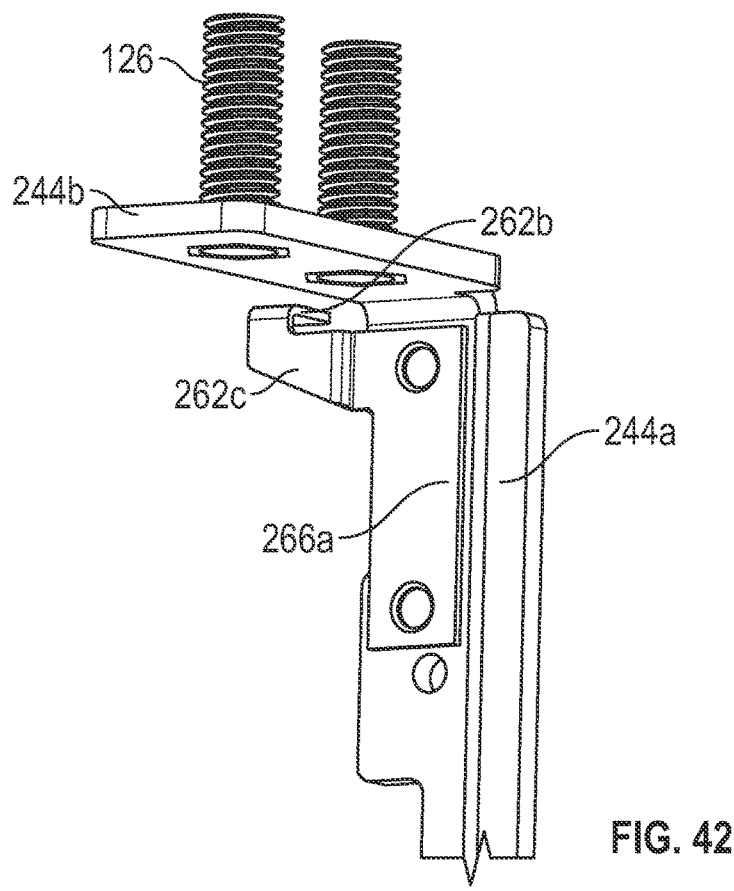
FIG. 42 is a detailed perspective view of the bus bar of FIG. 40.
Figure 43:
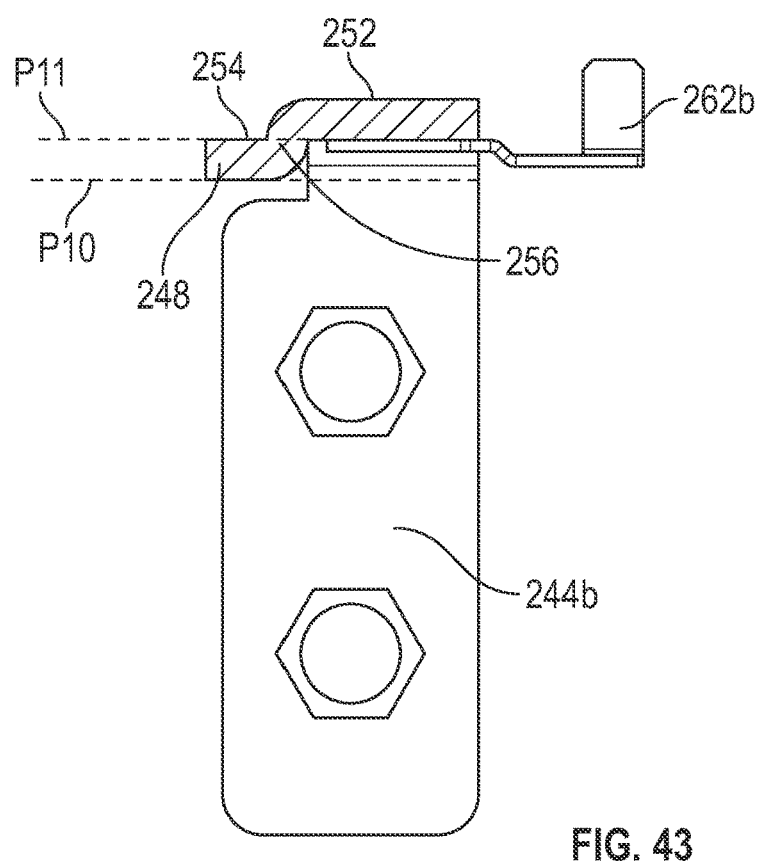
FIG. 43 is a cross-sectional view of the bus bar of FIG. 40 along the line 43-43 of FIG. 40.
Figure 44:
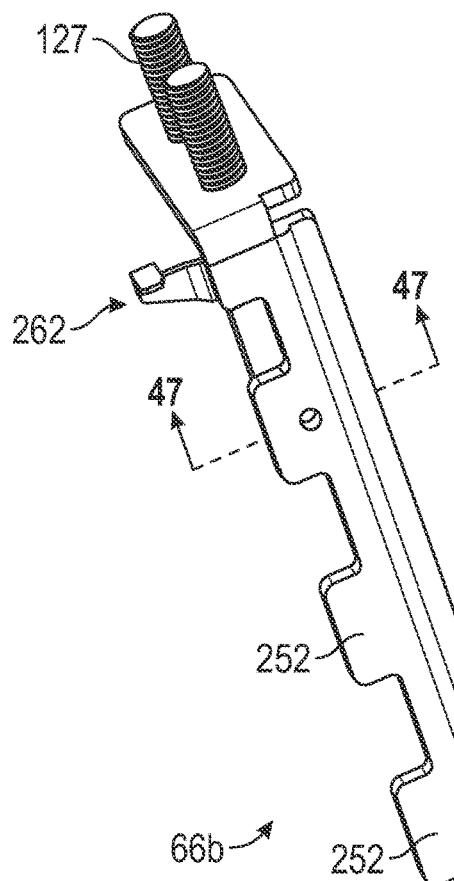
FIG. 44 is a perspective view of one of the plurality of bus bars of FIG. 29.
Figure 45:
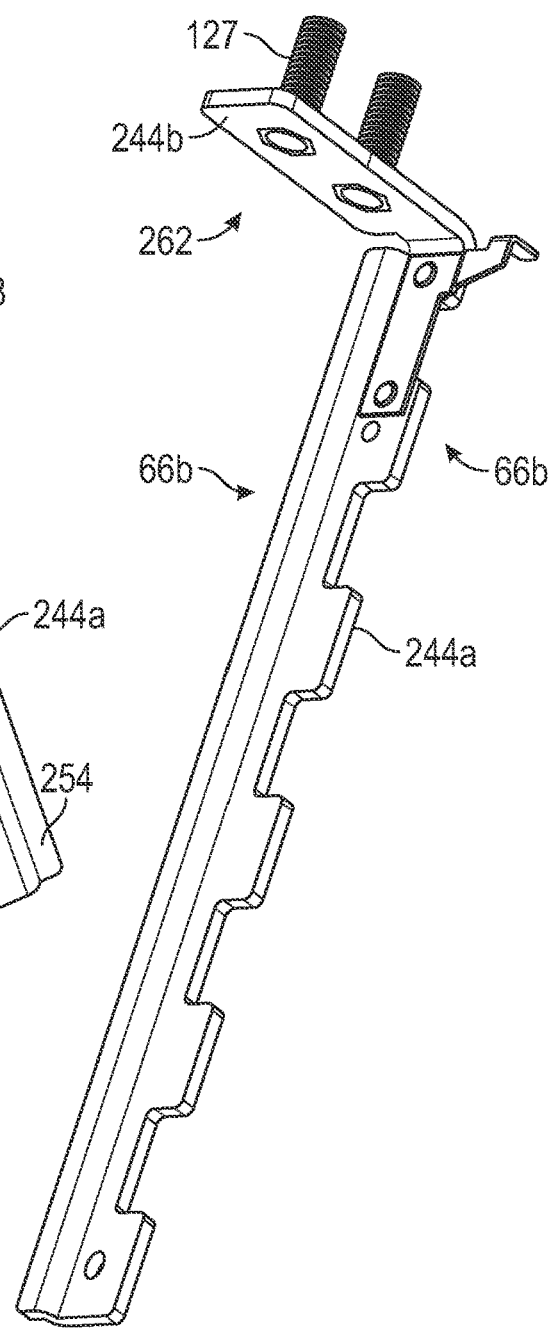
FIG. 45 is another perspective view of the of bus bar of FIG. 44.
Figure 46:
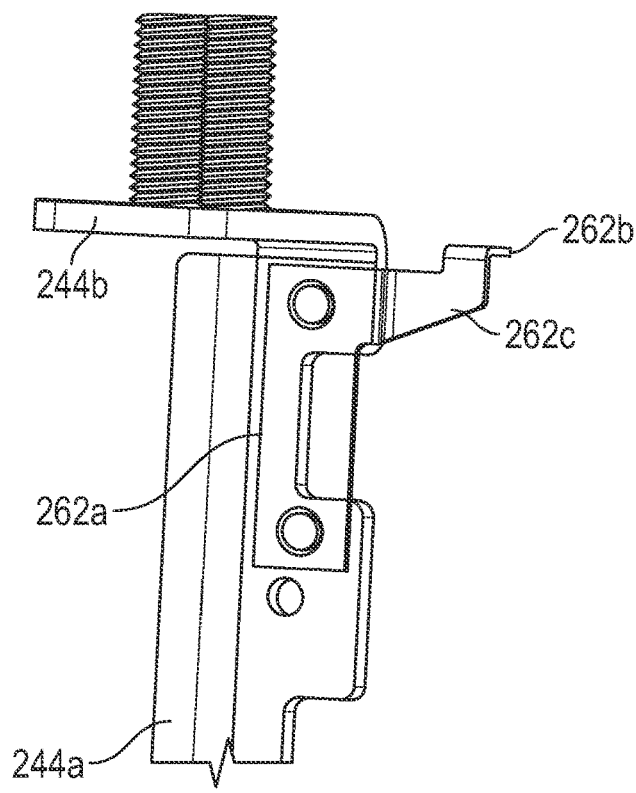
FIG. 46 is a detailed perspective view of the bus bar of FIG. 44.
Figure 47:
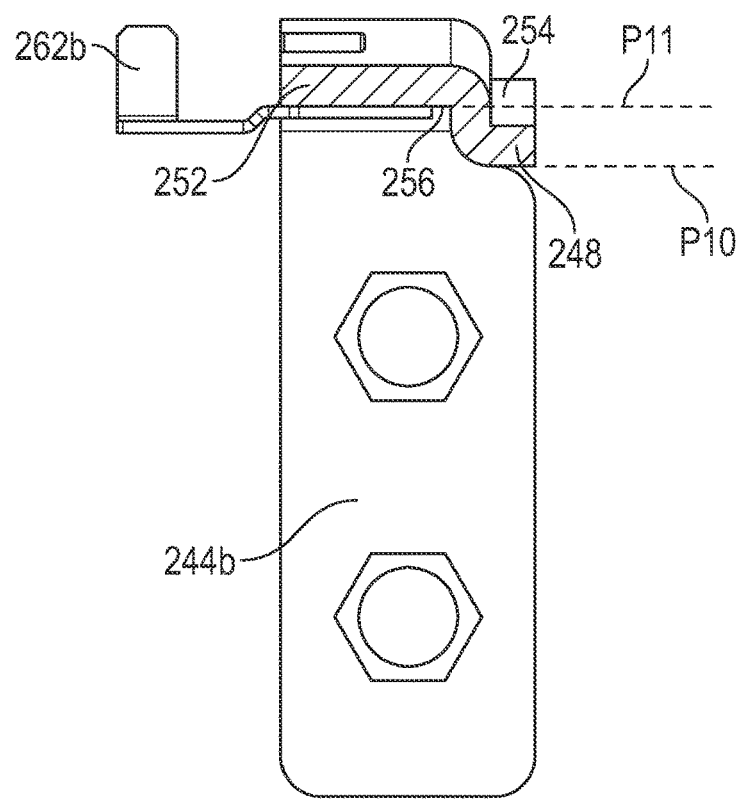
FIG. 47 is a cross-sectional view of the bus bar of FIG. 44 along the line 47-47 of FIG. 44.

In the illustrated embodiment, the middle bus bars 66 each include a first portion 238 formed from an elongated conductive body 244 having a longitudinal ridge or base 248, a plurality of first fingers 252a protruding laterally outward from a first side of the base 248, and a plurality of second fingers 252b protruding laterally outward from an opposite second side of the base 248. The fingers 252a, 252b are generally equal in width and each project the same lateral distance outward from the base 248. The fingers 252a, 252b are generally flat and each extend within a first plane P10 (FIGS. 38 and 39). The base 248 is also generally flat and extends within a second plane P11 that is parallel to the first plane P10 and offset therefrom. The base 248 defines a recess 254 extending along a length thereof. A first connecting section 256 connects the base 248 to the first fingers 252a and a second connecting section 260 connects the base 248 to the second fingers 252b. In the embodiment of FIGS. 29-39, the fingers 252a, 252b are aligned with each other along a longitudinal length of the bus bar 66. The middle bus bars 66 also include a second portion 262 that is coupled (e.g., via fasteners such as rivets or by any other suitable means). The second portion 262 is formed from a generally L-shaped conductive member. A first leg 262a of the L-shape is coupled to a bottom surface of the elongated conductive body 244 at a first end and extends beyond the first end of the elongated conductive body 244. A second leg 262b of the L-shape extends perpendicular from the first leg 262a.

Each of the primary bus bars 66a, 66b include a first portion 238 with a generally L-shaped conductive body 244. A first leg 244a of the L-shaped conductive body 244 that has a longitudinal ridge or base 248, a plurality of fingers 252 protruding laterally outward from one side of the base 248. That is, the rear bus bar 66b includes fingers 252 extending laterally outwardly from a first side of the base 248 (e.g., in a first direction towards the battery cells 62), and the front bus bar 66a has fingers 252 protruding laterally outward from the second side of the base 248 (e.g., in a second direction towards the battery cells 62). The fingers 252 are generally equal in width and each project the same lateral distance outward from the base 248. The fingers 252 are generally flat and each extend within a first plane P10 (FIGS. 42, 43, 46, 47). The base 248 is also generally flat and extends within a second plane P11 that is parallel to the first plane P10 and offset therefrom. A connecting section 256 connects the base 248 to the fingers 252. The second leg 244b of the L-shaped conductive body 244 is configured to receive and secure the respective positive 126, 164 and negative 127, 168 terminals, as discussed above. In the illustrated embodiment, the respective positive 126, 164 and negative 127, 168 terminals may be coupled to an aperture extending through the second legs via a press-fit engagement or another suitable type of engagement (e.g., a threaded engagement, etc.).

Like the middle bus bars 66, the primary bus bars 66a, 66b also include a second portion 262 that is coupled (e.g., via fasteners such as rivets or by any other suitable means) to the first portion 238 (e.g., the bottom surface of the first leg 244a). The second portion 262 is formed from a conductive member having a first leg 262a, an intermediate leg 262c extending from the first leg 262a, and second leg 262b extending from the intermediate leg 262c. The first leg 262a is coupled to a bottom surface of the first leg 244a of the first portion 238 at a first end. The intermediate leg 262c extends laterally outwardly from the first leg 262a. The second leg 262b extends perpendicular from the intermediate leg 262c.

In the illustrated embodiment, the first portion 238 of each of the bus bars 66, 66a, 66b is formed from a first conductive material, such as a material including aluminum or an aluminum alloy (e.g., AL 3003), and the second portion 262 of each of the bus bars 66, 66a, 66b is formed from a second, different conductive material, such as a material including copper or a copper alloy. In the illustrated embodiment, the second portion 262 is nickel and tin plated. That is, the second portion 262 has an outer layer that is formed from nickel and tin. In the illustrated embodiment, the respective positive 126, 164 and negative 127, 168 terminals may be formed of a third conductive material, such as a material including steel.

The bus bars 66, 66a, 66b are configured to be positioned within a corresponding elongate recess 200 of the first support member 102. Specifically, the base 248 is positioned within and supported by the first portion 204 of the corresponding elongate recess 200, while each of the fingers 252, 252a, 252b are positioned within and supported by a corresponding second portion 216, 216a, 216b of the elongate recess 200, 200a, 200b. With respect to the middle bus bars 66 in particular, each of the first fingers 252a is positioned in the second portion 216a and each of the second fingers 252b is positioned in the second portion 216b of the elongate recess 200. With respect to the outer bus bars 66a, 66b, the second leg 244b is positioned within the top recesses 200a', 200b'. Additionally, the recess 254 defined by the base 248 of each bus bar 66, 66a, 66b faces outwardly relative to the lateral surface 116. Also, when the bus bars 66, 66a, 66b are positioned in the respective elongate recess 200, 200a, 200b of the first support member 102, the second leg 262b of each of the second portions 262 is configured to be received in a pair of the aligned apertures 230, 234 of the lateral surface 116 and the voltage sensing PCB 136. Accordingly, a distal end of each of the second legs 262b extends from the lateral surface 116. As shown, the distal ends of each of the second legs 262b lie in the same plane P12. The second legs 262b of the bus bars 66, 66a, 66b are each soldered to the voltage sensing PCB 136 to electrically connect the bus bars 66, 66a, 66b with the voltage sensing PCB 136. Finally, a connection member 270 is positioned within the recess of each base 248 and integrally formed with the lateral surface 116 of the first support member 102 at opposite ends of the first portion of the bus bar 66, 66a, 66b. Specifically, the connection member 270 is formed by filling (e.g., via injection molding) the recess 254 of the corresponding base 248 of each bus bar 66 with a plastic material that forms the rest of the first support member 102 such that each of the connection members 270 are integrally joined with the lateral surface 116 of the first support member 102 at opposite ends of the first portion 238 of the bus bar 66, 66a, 66b. As shown, the connection member 270 is elongate and linear and therefore leaves the fingers 252, 252a, 252b exposed for connection with the battery cells 626 via bonded wires 140, as discussed above. Accordingly, the bus bar 66 is coupled to the first support member 102 via injection molding rather than fasteners.

The following method may be used to form the battery assembly 18 of FIGS. 29-47. The first support member 102 and a second support member 104 may each be formed from a plastic material. A bus bar 66, 66a, 66b may be positioned within one of the elongate recesses 200, 200a, 200b of the first support member 102 and second support member 104. The connection members 270 may be formed by injecting the recess 254 of each of the bases 248 with the plastic material such that the plastic material fills the recess 254 and integrally forms with the respective first support member 102 and second support member 104. This process leaves the fingers 252, 252a, 252b exposed. The battery cells 62 are positioned between the first support member and the second support member. Wires are bonded between the fingers 252, 252a, 252b of each of the bus bars 66, 66a, 66b and either the positive terminal 126, 164 or the negative terminals 127, 168. The method further includes coupling (e.g., soldering) the second legs 262b of the second portions 262 of the bus bars 66, 66a, 66b to the voltage sensing PCB 136.

The shape of the elongate recesses 200, 200a, 200b and the shape of the corresponding bus bars 66, 66a, 66b of FIGS. 29-47 are merely exemplary. In other embodiments, the elongate recesses 200, 200a, 200b and the bus bars 66, 66a, 66b may have other suitable complementary shapes.

For example, in some embodiments, the second portions 262 may be omitted from configuration of the bus bars 66, 66*a*, 66*b* of FIGS. 29-47. In such case, the bus bars 66, 66*a*, 66*b* may be otherwise electrically coupled to the voltage sensing PCB 136 in other ways (e.g., via wire bonding, welding, or any other suitable method). In another example, the elongate recesses 200, 200*a*, 200*b* may be shaped to accommodate any of the other bus bar 66, 66*a*, 66*b* configuration disclosed herein.

Although the disclosure has been described in detail with reference to certain preferred embodiments, variations and modifications exist within the scope and spirit of one or more independent aspects of the disclosure as described.

What is claimed is:

1. A mobile power source comprising:
   a battery pack including at least two battery cell assemblies, each battery cell assembly including
      a plurality of battery cells each having a first end, a second end opposite the first end, a positive terminal located at the first end and a negative terminal located at the first end,
      a frame having a first support member and a second support member, each of the first and second support members including a plurality of cylindrical recesses arranged in vertical columns that receive the plurality of battery cells to support the battery cells and elongate recesses, each of the elongate recesses positioned adjacent to at least one column of the plurality of cylindrical recesses; and
      a bus bar positioned within each of the plurality of elongate recesses of the first support member and configured to electrically connect to at least two battery cells, each of the bus bars including an elongated conductive body having a base and fingers extending laterally away from the base, the base defining a recess extending along a longitudinal length of the base between at least two of the fingers, the fingers extending within a first plane and the base extending within a second plane that is parallel to the first plane and offset therefrom;
      a connection member filling the recess in each base and integrally formed with the first support member to couple the corresponding bus bar to the first support member; and
      wires that connect the fingers of each the bus bars to either the positive terminal or the negative terminals.

2. The mobile power source of claim 1, wherein each of the bus bars include a first portion that includes the base and the fingers and a second portion coupled between the first portion and a voltage sensing PCB.

3. The mobile power source of claim 2, wherein the first portion is formed from a first material and the second portion is formed from a second material that is different than the first material.

4. The mobile power source of claim 2, wherein the first portion is formed from a material formed from aluminum and the second portion is formed from a material that formed from copper.

5. The mobile power source of claim 1, wherein the bus bar positioned in a first outer elongated recess is a first outer bus bar, the bus bar positioned in a second outer elongated recess is a second outer bus bar, and the bus bars positioned within middle recesses positioned between the first outer recess and the second outer recess are middle bus bars, and wherein
   the fingers of the first outer bus bar extend from the base in a first direction,
   the fingers of the second outer bus bar extend from the base in a second direction, and
   the fingers of the middle bus bars include first fingers extending in the first direction from the base and second fingers extending in the second direction from the base.

6. The mobile power source of claim 5, wherein the first fingers and the second fingers are aligned along the longitudinal length of the base.

7. The mobile power source of claim 5, wherein the wires include
   first wires that connect the fingers of one of the first outer bus bar or the second outer bus bar to the negative terminals of at least two battery cells and the first fingers of each of the middle bus bars to the negative terminals of at least two battery cells, and
   second wires that connect the fingers of the other of the first outer bus bar or the second outer bus bar to the positive terminals of at least two battery cells and the second fingers of the middle bus bars to the positive terminals.

8. The mobile power source of claim 1, wherein the bus bars are coupled to the first support member without fasteners.

9. The mobile power source of claim 1, wherein the first support member and the connection member are both formed from a same material.

10. A method of forming a mobile power supply, the method comprising:
    forming a frame having a first support member and a second support member, each of the first and second support members being formed from a plastic material and including a plurality of cylindrical recesses arranged in vertical columns that receive the plurality of battery cells to support the battery cells and elongate recesses, each of the elongate recesses positioned adjacent to at least one column of the plurality of cylindrical recesses;
    positioning a bus bar within one of the elongate recesses of the first support member, each bus bar including an elongated conductive body having a base and fingers extending laterally away from the base, the base defining a recess extending along a longitudinal length of the base between at least two of the fingers, the fingers extending within a first plane and the base extending within a second plane that is parallel to the first plane and offset therefrom;
    injecting the recess of each of the bases with the plastic material such that the plastic material fills the recess and integrally forms with the first support member;
    positioning a plurality of battery cells between the first support member and the second support member such that the plurality of cylindrical recesses of the first support member and the second support member support the plurality of battery cells, each of the battery cells having a first end, a second end opposite the first end, a positive terminal located at the first end, and a negative terminal located at the first end; and
    wire bonding wires between the fingers each of the bus bars and either the positive terminal or the negative terminals.

11. The method of claim 10, wherein injecting the recess of each of the bases with the plastic material such that the plastic material integrally forms with the first support member includes leaving the fingers exposed.

12. The method of claim 10, wherein each of the bus bars include a first portion having the base and the fingers and a second portion coupled to and extending from the first portion, the first portion being formed of a first conductive material and the second portion being formed of a second conductive material that is different from the first conductive material.

13. The method of claim 12, further comprising coupling the second portion to a voltage sensing PCB.

* * * * *